United States Patent
Wong

(10) Patent No.: US 12,088,528 B2
(45) Date of Patent: Sep. 10, 2024

(54) COMMUNICATIONS DEVICES, INFRASTRUCTURE EQUIPMENT AND METHODS

(71) Applicant: Sony Group Corporation, Tokyo (JP)

(72) Inventor: Shin Horng Wong, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 331 days.

(21) Appl. No.: 17/770,338

(22) PCT Filed: Nov. 6, 2020

(86) PCT No.: PCT/EP2020/081368
§ 371 (c)(1),
(2) Date: Apr. 20, 2022

(87) PCT Pub. No.: WO2021/089832
PCT Pub. Date: May 14, 2021

(65) Prior Publication Data
US 2022/0393830 A1    Dec. 8, 2022

(30) Foreign Application Priority Data
Nov. 8, 2019 (EP) .................................... 19208170

(51) Int. Cl.
*H04L 5/00* (2006.01)
*H04W 72/21* (2023.01)
*H04W 72/541* (2023.01)

(52) U.S. Cl.
CPC .......... *H04L 5/0053* (2013.01); *H04W 72/21* (2023.01); *H04W 72/541* (2023.01)

(58) Field of Classification Search
None
See application file for complete search history.

(56) References Cited

U.S. PATENT DOCUMENTS
2017/0141901 A1* 5/2017 Rico Alvarino ...... H04L 5/0051

FOREIGN PATENT DOCUMENTS
WO    2018/050431 A1    3/2018
WO    2018/228865 A1    12/2018
WO    2019/199121 A1    10/2019

OTHER PUBLICATIONS

International Search Report and Written Opinion mailed on Feb. 1, 2021, received for PCT Application PCT/ EP2020/081368, Filed on Nov. 6, 2020, 19 pages.

(Continued)

*Primary Examiner* — Suhail Khan
(74) *Attorney, Agent, or Firm* — XSENSUS LLP

(57) ABSTRACT

A communications device comprises transceiver circuitry configured to transmit signals to and receive signals from a wireless communications network via a wireless access interface of the wireless communications network, and controller circuitry configured in combination with the transceiver circuitry to determine uplink communications resources of the wireless access interface to be used for the transmission of data by the communications device, to receive a plurality of uplink cancellation indicators that each indicate that at least a portion of the uplink communications resources is allocated for the transmission of signals by another communications device and is located within communications resources of one of a plurality of reference regions, and to determine, in accordance with dimensions of a first reference region and dimensions of a second reference region, that at least a portion of the uplink communications resources is allocated for the transmission of signals by another communications device.

20 Claims, 18 Drawing Sheets

(56) References Cited

OTHER PUBLICATIONS

Holma, H. and Toskala, A., "LTE for Umts OFDMA and SC-FDMA Based Radio Access", John Wiley & Sons, 2009, 232 pages.
3GPP, "Multiplexing and Channel Coding (Release 15)", 3GPP TS 38.212, V15.3.0, Sep. 2018, 99 pages.
3GPP, "Study on Physical Layer Enhancements for NR Ultra-Reliable and Low Latency Case (URLLC) (Release 16)", 3GPP TR 38.824, V1.2.0, Mar. 2019, 84 pages.
VIVO, "Summary#3 of UL Inter UE Tx Prioritization/Multiplexing", 3GPP TSG RAN WG1 Meeting Ad-Hoc Meeting 1901, R1-1901457 ((updated from R1-1901407)), Jan. 21-25, 2019, 54 pages.
VIVO, "Summary of UL Inter UE Tx Prioritization/Multiplexing", 3GPP TSG RAN WG1 Meeting #94bis, R1-1811905, Oct. 8-12, 2018, 21 pages.
Sony, "UL Inter UE Transmission Prioritisation & Multiplexing", 3GPP TSG RAN WG1 #98, R1-1908781, Aug. 26-30, 2019, 7 pages.
Qualcomm Incorporated, "Uplink inter-UE Tx Multiplexing and Prioritization", 3GPP TSG-RAN WG1 #98, R1-1909268, Aug. 26-30, 2019, 10 pages.
3GPP, "NR and NG-RAN Overall Description; Stage 2 (Release 15)", 3GPP TS 38.300, V15.2.0, Jun. 2018, 87 pages.
VIVO, "Summary#4 of UL Inter UE Tx Prioritization/Multiplexing", 3GPP TSG RAN WG1 #98bis, R1-1911712, Oct. 14-20, 2019, 40 pages.
ZTE, "On scheduling/HARQ Enhancements for NR URLLC", 3GPP TSG RAN WG1 #98bis, R1-1910103, Oct. 14-20, 2019, 5 pages.
OPPO, "Inter UE Tx Prioritization and Multiplexing", 3GPP TSG RAN WG1 #98, R1-1908671, Aug. 26-30, 2019, 9 pages.
ETSI, "Multiplexing and Channel Coding (3GPP TS 38.212 version 15.6.0 Release 15)", ETSI TS 138 212, V15.6.0, Jul. 2019, 106 pages.
Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.
Huawei, et al., "New WID: Physical Layer Enhancements for NR Ultra-Reliable and Low Latency Communication (URLLC)", 3GPP TSG RAN Meeting #83, RP-190726 ((revision of RP-190654)), Mar. 18-21, 2019, 5 pages.
Holma, H. and Toskala, A., "LTE for UMTS OFDMA and SC-FDMA Based Radio Access", John Wiley & Sons, 2009, pp. 25-27.
3GPP, "Multiplexing and Channel Coding (Release 15)", 3GPP TS 38.212, V15.4.0, Dec. 2018, 101 pages.

\* cited by examiner

COMMUNICATIONS DEVICES, INFRASTRUCTURE EQUIPMENT AND METHODS

CROSS-REFERENCE TO RELATED APPLICATIONS

The present application is based on PCT filing PCT/EP2020/081368, filed Nov. 6, 2020, which claims priority to EP 19208170.1, filed Nov. 8, 2019, the entire contents of each are incorporated herein by reference.

BACKGROUND

Field of Disclosure

The present disclosure relates to communications devices which are configured to transmit data to infrastructure equipment in a wireless communications network, where the transmission of the data by the communications devices may be pre-empted by another transmission.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

The increasing use of different types of network infrastructure equipment and communications devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above as defined in the appended claims.

Embodiments of the present technique can provide a communications device configured to transmit signals to or receive signals from a wireless communications network. The communications device comprises transceiver circuitry configured to transmit signals to and receive signals from the wireless communications network via a wireless access interface of the wireless communications network, and controller circuitry configured in combination with the transceiver circuitry to determine uplink communications resources of the wireless access interface to be used for the transmission of data by the communications device, to receive a plurality of uplink cancellation indicators that each indicate that at least a portion of the uplink communications resources is allocated for the transmission of signals by another communications device and is located within communications resources of one of a plurality of reference regions, each of the reference regions being associated with one of the uplink cancellation indicators, to determine that a portion of a first of the reference regions overlaps in both of frequency and time with a portion of a second of the reference regions, the portion of the uplink communications resources located within the communications resources of the first reference region being a first portion of the uplink communications resources and the portion of the uplink communications resources located within the communications resources of the second reference region being a second portion of the uplink communications resources, and to determine, in accordance with dimensions of the first reference region and dimensions of the second reference region, that at least a third portion of the uplink communications resources is allocated for the transmission of signals by another communications device Embodiments of the present technique can further provide a communications device configured to transmit signals to or receive signals from a wireless communications network. The communications device comprises transceiver circuitry configured to transmit signals to and receive signals from the wireless communications network via a wireless access interface of the wireless communications network, and controller circuitry configured in combination with the transceiver circuitry to determine uplink communications resources of the wireless access interface to be used for the transmission of data by the communications device, to receive an uplink cancellation indicator that indicates that at least a portion of the uplink communications resources is allocated for the transmission of signals by another communications device and is located within communications resources of a reference region associated with the uplink cancellation indicator, the reference region being formed of a specified number of sub-regions, to determine that an overlapping portion of the reference region overlaps in both of frequency and time with a region of the wireless access interface that is dedicated for downlink transmissions, to determine that one or more of the sub-regions that are at least partially located within the overlapping portion of the reference region are to be excluded from the reference region, and to repartition at least one of the sub-regions that are not to be excluded from the reference region to form smaller sub-regions such that, after the adjustment, the number of sub-regions that are not to be excluded from the reference region is equal to the specified number of sub-regions.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
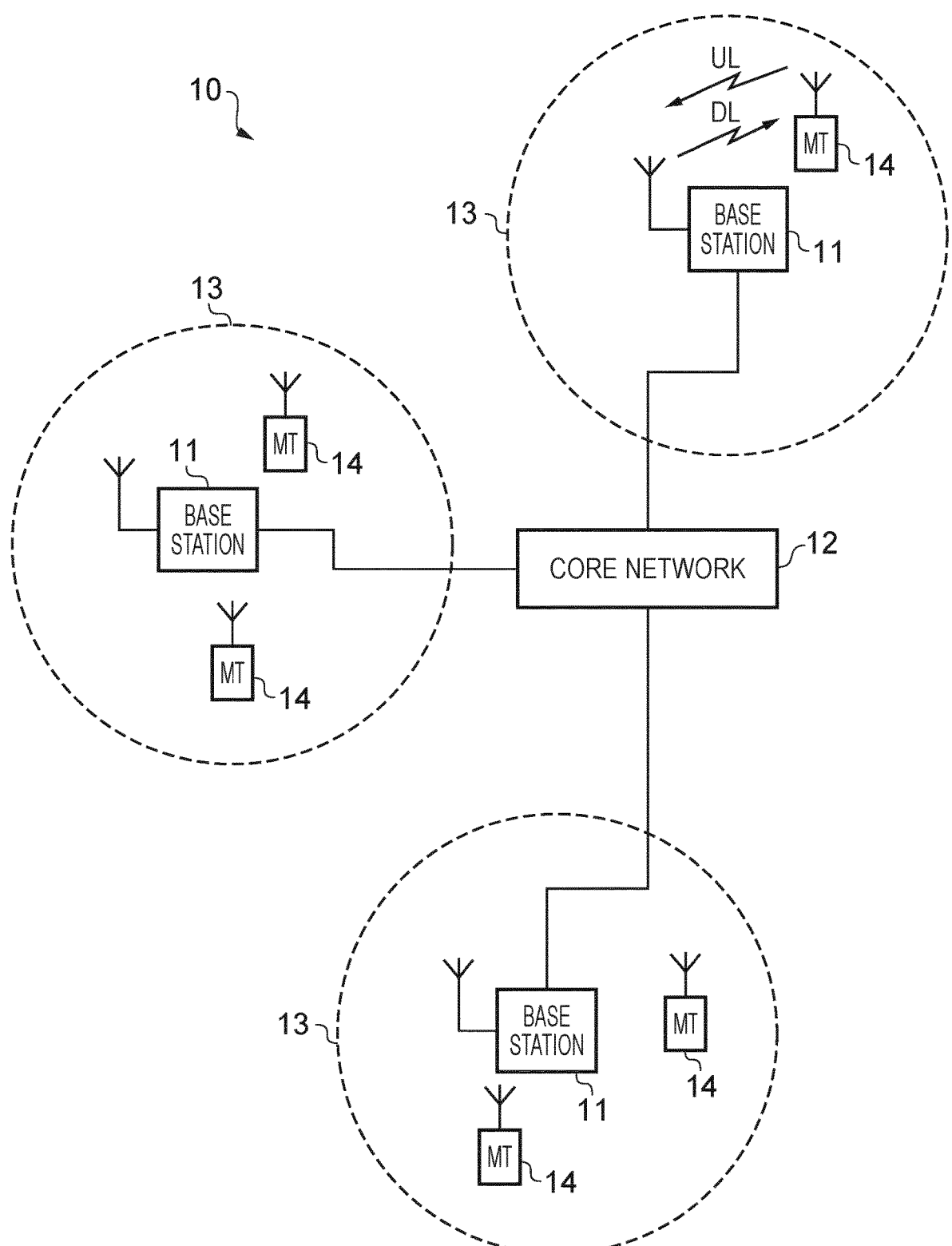
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:
Enhanced Mobile Broadband (eMBB);
Massive Machine Type Communications (mMTC);
Ultra Reliable & Low Latency Communications (URLLC) [3]; and
Enhanced Ultra Reliable & Low Latency Communications (eURLLC) [4].

URLLC services require that a URLLC data packet (e.g. 32 bytes) is required to be transmitted from the radio protocol layer 2/3 Service Data Unit (SDU) ingress point to the radio protocol layer 2/3 SDU egress point of the radio interface with a latency that is less than 1 ms or 0.5 ms and with a reliability of 99.999% to 99.9999%. eURLLC services require high reliability and low latency, and may find applications in factory automation, the transport industry, electrical power distribution and the like. On the other hand, eMBB services are characterised by high capacity with a requirement to support high data rates (e.g. up to 20 Gb/s) with moderate latencies and reliabilities (e.g. 99% to 99.9%).

The elements of the wireless access network shown in FIG. 1 may be equally applied to a 5G new RAT configuration, except that a change in terminology may be applied as mentioned above.

Figure 2:
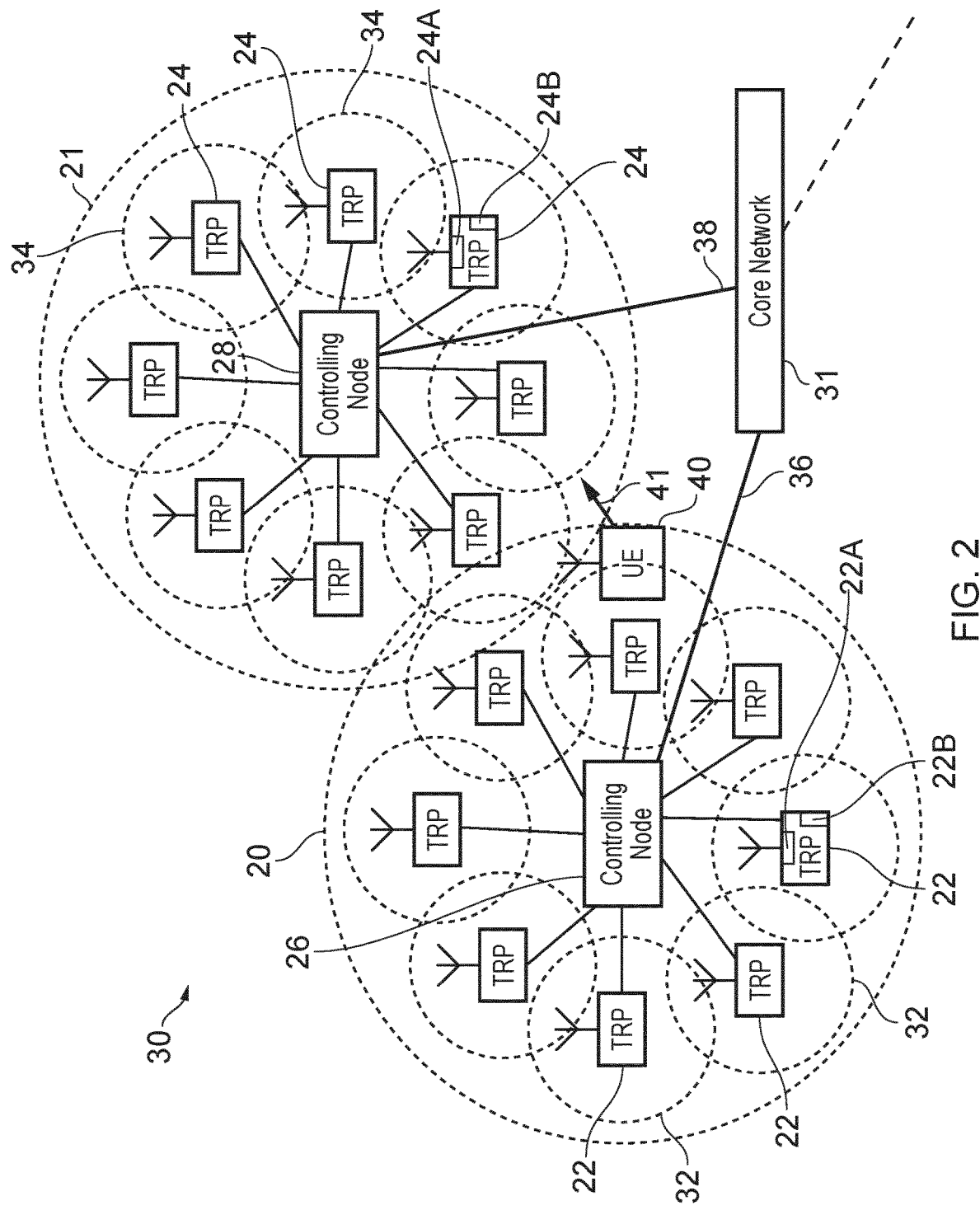
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/ remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/ centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Downlink Pre-Emption Indicator

In the mobile communications networks illustrated in FIGS. 1 and 2, transmissions may be separated in time and frequency. That is, a transmission may use a set of resources defined in terms of a time period and a frequency range, and different transmissions may use other, non-overlapping resources and may accordingly be received and decoded individually. As such, in the examples described herein, the term resources is used to refer to (jointly) time and frequency resources. However, the principles described herein may apply to other transmission schemes where a resource may refer to any portion of a range of parameters that may apply to a transmission, such that the use of the same resource for the transmission of two different pieces of information (for example, an eMBB transmission and a ULLRC transmission) is either not feasible or likely to result in severe decrease in the likelihood of successful reception of one or both. Other examples of resources may therefore include orthogonal spreading codes, orthogonal spatial transmission links, and the like. A resource may be defined in terms of a combination of multiple such parameters (as in the examples described herein, wherein a resource is characterised by time and frequency), or may refer to a single dimension (e.g. by reference solely to time).

As discussed above, a mobile communications network such as the network illustrated in FIG. 2 may be used to carry transmissions for services with a variety of constraints, such as high data rate traffic which has some tolerance to delay and traffic which has a low tolerance to delay, which may also have a lower data rate. While the principles of the disclosure will be illustrated in the context of a mobile network where a network element (e.g. TRP, eNB, BTS, . . . ) transmits eMBB and URLLC data to a terminal device, it will be appreciated that the same principles apply to 3G networks, LTE networks (such as that illustrated in FIG. 1) or any other suitable network and to any appropriate type or types of data. Likewise, the same principles and teachings can also be used for uplink transmissions from a terminal device to a network receiver (e.g. BTS, eNB, TRP, etc.) or for transmissions between peer devices.

Although the description herein relates to eMBB and URLLC (or indeed eURLLC) traffic, the disclosure is not so limited. For example, the disclosure is pertinent where the transmission data transmitted to a different device (the URLLC in embodiments) has different latency & reliability requirement to the transmission data for which the resources are initially allocated (the eMBB in embodiments) and the data transmitted to the different device uses some or all of the resources initially allocated.

A principle of eMBB data is that, in order to reduce the overhead associated with control information, the data transmission occurs over a relatively long time period (e.g. 0.5 ms, 1 ms, 5 ms, 10 ms or 50 ms), and as such the control channel associated with an eMBB transmission uses significantly smaller transmission resources than that of the data channel. In this manner, the relative overhead caused by the transmission of control information is reduced. On the other hand, in order to meet a low latency requirement associated with a URLLC transmission, the URLLC data resources may be relatively shorter, such as 0.25 ms. An example requirement currently considered for URLLC is a low latency transmission measured from the ingress of a layer 2 packet to its egress from the network, with a proposed target of 1 ms.

Since URLLC is intolerant to latency, it is agreed that URLLC can occupy (that is, be transmitted using) a subset of the resources that have been previously allocated for an eMBB transmission. Although a URLLC transmission may comprise a relatively smaller amount of data than an eMBB transmission, it may be necessary that, for example in order to meet a latency requirement, a URLLC transmission occupies a very high bandwidth for a short time period. The bandwidth (i.e. the extent of the transmission resources when measured in the frequency domain) used for a URLLC transmission may therefore exceed that of an eMBB transmission. In particular, the bandwidth used for a single URLLC transmission may span the frequency range used by two or more ongoing eMBB transmissions. As such, a particular problem arises when a single URLLC transmission uses resources allocated for two or more different eMBB transmissions. This is illustrated in FIG. 3.

Figure 3:
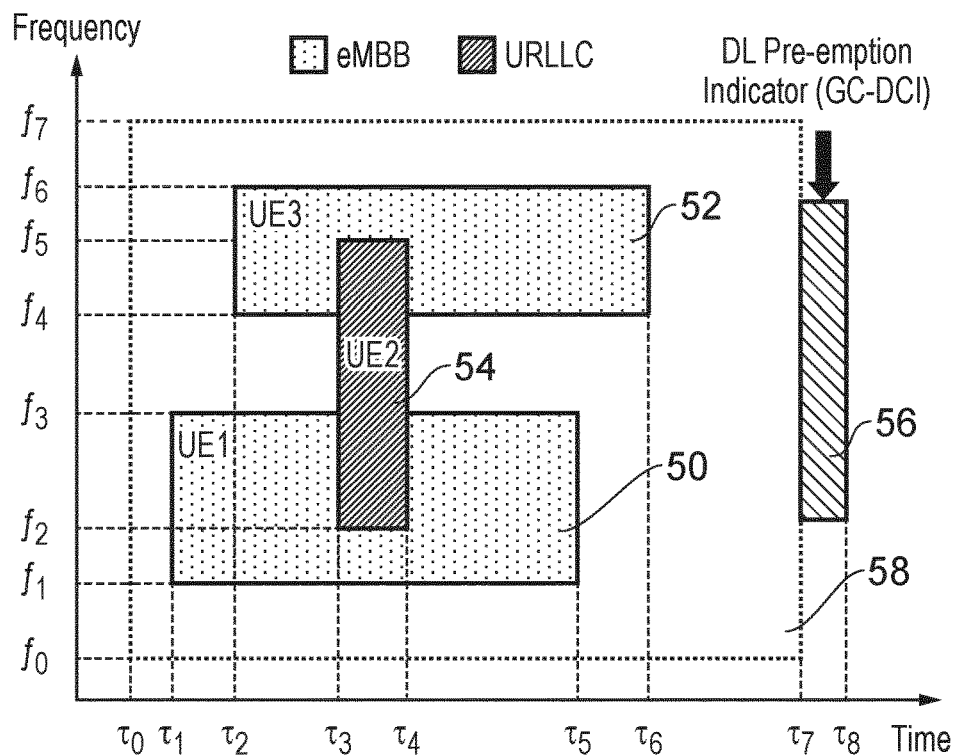
FIG. 3 shows an example of a downlink pre-emption indicator (DL PI)

FIG. 3 illustrates data transmissions from a base station or gNB to terminal devices. On the horizontal axis is shown a progression of time while the vertical axis shows a frequency range. The data transmissions 50, 52 having a relatively longer time duration that are transmitted to UE1 and UE3 are examples of first and second eMBB transmissions, while the transmission 54 using a relatively larger frequency range over a shorter time period that is transmitted to UE2 is an example of a URLLC transmission. In the example shown in FIG. 3, the URLLC transmission 54 uses resources which have been allocated for the first and second eMBB transmissions 50, 52. FIG. 3 also illustrates the principle that an eMBB transmission typically occurs over a long duration but over a relatively limited frequency range while a URLLC transmission may occupy a much shorter time period but may use a much wider range of frequencies in order to meet the latency requirement of the URLLC data.

One aspect of URLLC is that the URLLC transmission (for example URLLC transmission 54) can pre-empt the resources previously allocated for another, lower priority, transmission such as eMBB data (for example eMBB transmissions 50, 52), after those resources have already been scheduled, in order to ensure that the URLLC transmission 54 is able to meet its latency requirements. However, it will be clear to the skilled person that the possibility of correctly decoding the affected eMBB transmissions 50, 52 will be negatively impacted by the fact that some portion of the resources which were allocated for their transmission has in fact been used for the transmission of the URLLC data 54. In order to assist receivers of the eMBB data transmissions 50, 52, it has been agreed in Rel-15, for downlink URLLC & eMBB operation, a downlink Pre-emption Indicator (DL PI) is used to inform the eMBB UE that some of its resources have been pre-empted by another UE's transmission. Such a DL PI was first proposed in co-pending European patent application [5], the contents of which are incorporated herein by reference.

An example of a DL PI 56 is also shown in FIG. 3, where as described above eMBB transmission 50 is transmitted to a UE, e.g. UE1, between time $\tau_1$ and $\tau_5$. At $\tau_3$, the gNB transmits URLLC transmission 54 to another UE, e.g. UE2, where this URLLC transmission 54 ends at time $\tau_4$. In other words, as described above, the URLLC transmission 54 for UE2 pre-empts part of the resources that are originally scheduled for UE1's eMBB transmission 50. A downlink Pre-emption Indicator (DL PI) 56 is transmitted by the gNB at time $\tau_7$ to indicate to UE1 that part of its resources have been pre-empted so that UE1 can take ameliorative steps in decoding the eMBB message 50; for example, UE1 can zero out the soft bits corresponding to the pre-empted parts.

In Rel-15 NR, the DL Pre-emption Indicator is transmitted using Downlink Control Information (DCI); specifically, a Group Common DCI (GC-DCI, also known as DCI Format 2_1 in 3GPP [6]), where a GC-DCI contains control information for a group of UEs. The rationale behind using a GC-DCI is that the URLLC in the downlink is expected to occupy a wide frequency bandwidth (but a narrow period of time) and so it is likely that the URLLC will pre-empt more than one eMBB UE. For example in FIG. 3, as described above, URLLC transmission 54 transmitted to UE2 occupies frequency resource from $f_2$ to $f_5$, which would pre-empt resources 50, 52 originally scheduled for UE1 and UE3. Instead of transmitting multiple Pre-emption Indicators to UE1 and to UE3, it is deemed more efficient to transmit a single Pre-emption Indicator 56 to a group of UEs. This Pre-emption Indicator 56 just needs to indicate the resources occupied by the URLLC transmission 54, e.g. occupying time $\tau_3$ to $\tau_4$ and frequency $f_2$ to $f_5$. The UEs receiving this Pre-emption Indicator 56 will determine which resources 54 indicated by the Pre-emption Indicator 56 overlap with their most recent eMBB transmission 50, 52; for example in FIG. 3, UE1 will determine that the resources between time $\tau_3$ and $\tau_4$ and frequency $f_2$ and $f_3$ are pre-empted, whilst UE3 will determine that the resources between time $\tau_3$ and $\tau_4$ and frequency $f_4$ and $f_5$ are pre-empted.

The GC-DCI carrying the Downlink Pre-emption Indicator addresses a Reference Downlink Region (RDR). The RDR was proposed in co-pending European patent application [7], the contents of which are incorporated herein by reference. For example, in FIG. 3, an RDR 58 is defined between time $\tau_0$ and $\tau_7$ and between frequency $f_0$ to $f_7$. The Pre-emption Indicator 56 carried by the GC-DCI only indicates pre-empted resources if those pre-empted resources fall within this RDR 58 and an eMBB UE with a transmission 50, 52 that falls within the RDR 58 will read the Pre-emption Indicator 56 in the corresponding GC-DCI to determine where (if any), the pre-empted resources are. The RDR occurs periodically in time, i.e. a GC-DCI is monitored periodically, and occupies a fixed frequency region. In Rel-15 NR, the frequency region occupied by the RDR is equivalent to the Bandwidth Part (BWP) of the UEs configured to monitor the GC-DCI corresponding to that RDR. The BWP is a fraction of the system bandwidth configured by the network for a UE to operate in and the rationale for the use of BWPs is that a UE operating in a narrow bandwidth would consume less power than one operating over the whole (and much wider) system bandwidth.

Figure 4A:
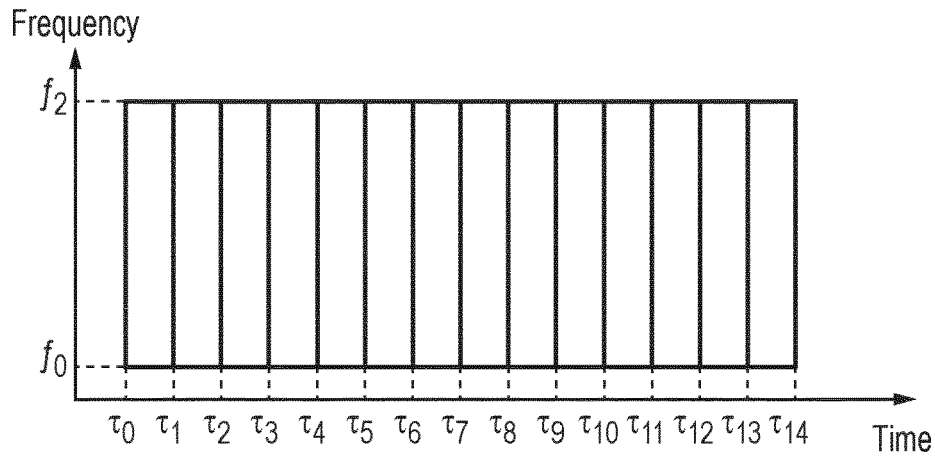
FIGS. 4A and 4B illustrate two examples of reference downlink regions addressed by a DL PI.
Figure 4B:
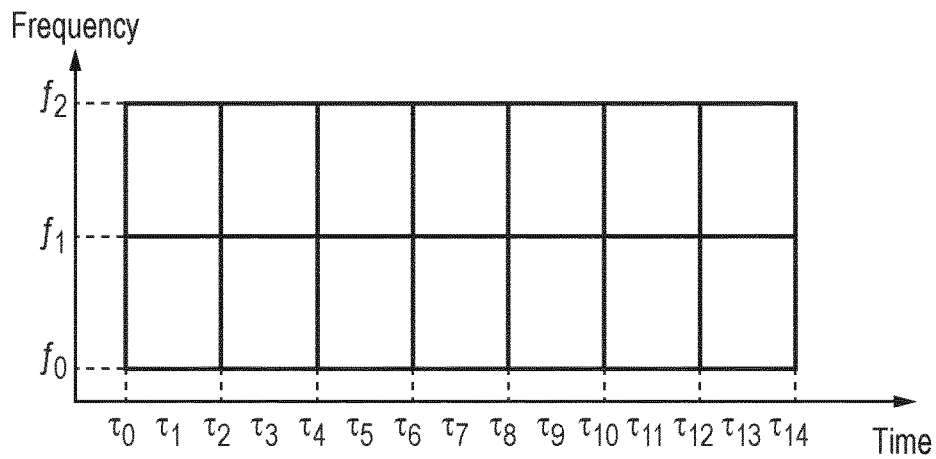

In Rel-15 NR, the number of information bits for the Downlink Pre-emption Indicator is fixed at 14 bits, where it can be RRC configured to indicate either a bitmap of 1×14 or a bitmap of 2×7, which determines how the RDR is divided into resource regions. That is, the RDR can be divided into 1 frequency region by 14 time regions or 2 frequency regions by 7 time regions. This is shown in FIGS. 4A and 4B, where an RDR is shown to occupy time $\tau_0$ to $\tau_{14}$ and frequency $f_0$ to $f_2$. The RDR resource regions grid in FIG. 4A is represented by the bitmap of dimension 1×14 and the RDR resource regions grid in FIG. 4B is represented by the configured bitmap of dimension 2×7. The bitmap will indicate which resource region(s) is pre-empted. The Downlink Pre-emption Indicator indicates which of these regions are pre-empted by another (URLLC) UE.

Figure 5:
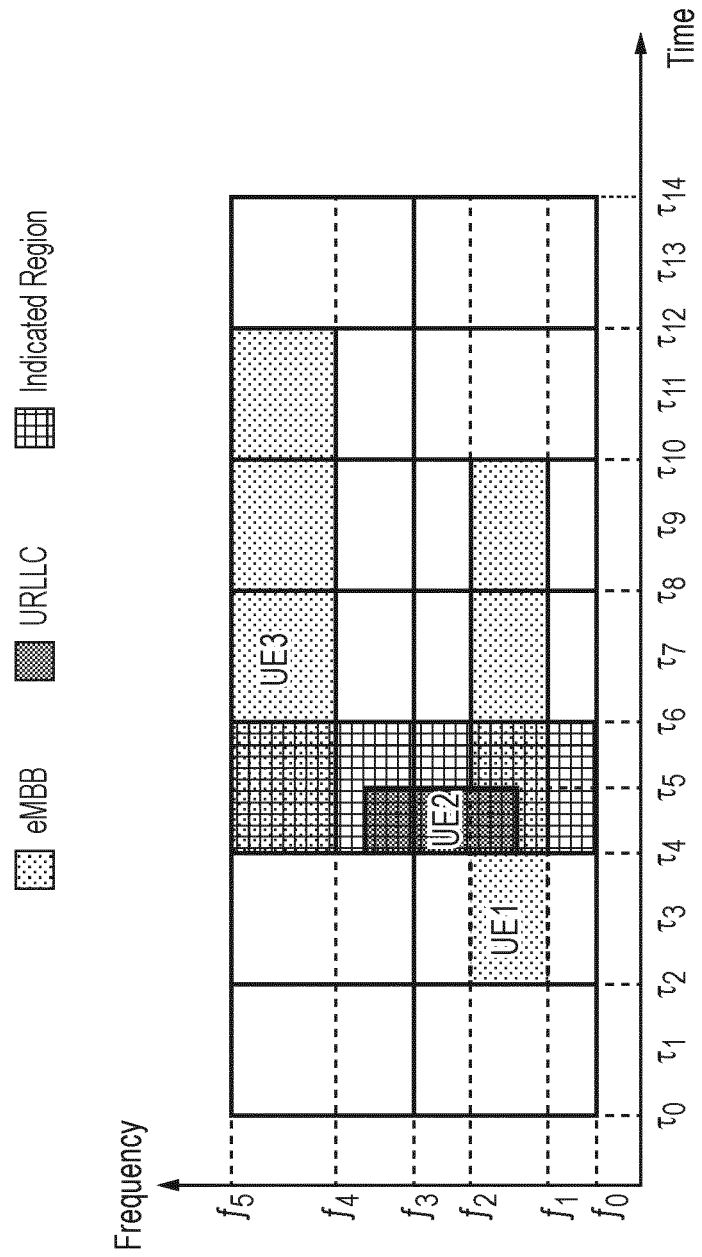
FIG. 5 illustrates an example of ghost pre-emption.

Since the bitmap grid of 1×14 as shown in FIG. 4A or 2×7 as shown in FIG. 4B is projected onto the RDR, the granularity of each region is dependent upon the size of the RDR. That is, if the RDR is large, then the granularity is coarse, and vice-versa when the RDR is small. Consider the RDR in FIG. 5, which occupies the time $\tau_0$ to $\tau_{14}$ and frequency $f_0$ to $f_5$. Two eMBB UEs, UE1 and UE3 are scheduled at time $\tau_2$ and $\tau_4$ respectively and during the transmissions of these two eMBB UEs, the gNB transmits a URLLC transmission to UE2 during time $\tau_4$ to $\tau_5$, which pre-empted some of the resources for UE1. If the resource grid using bitmap 2×7 is configured, the gNB would indicate that two resource regions, i.e. the entire RDR between times $\tau_4$ and $\tau_6$, is pre-empted as shown in green blocks in FIG. 5. UE1 would then assume a much larger pre-empted region than necessary, and UE3—which is not even pre-empted—would assume that a quarter of its resources are pre-empted. The coarse granularity of the Pre-emption Indicator causes ghost pre-emption; i.e. resources that are not pre-empted but are wrongly indicated to be pre-empted. This can have significant impact on the UE's decoding performance.

Uplink Cancellation Indicator

Figure 6:
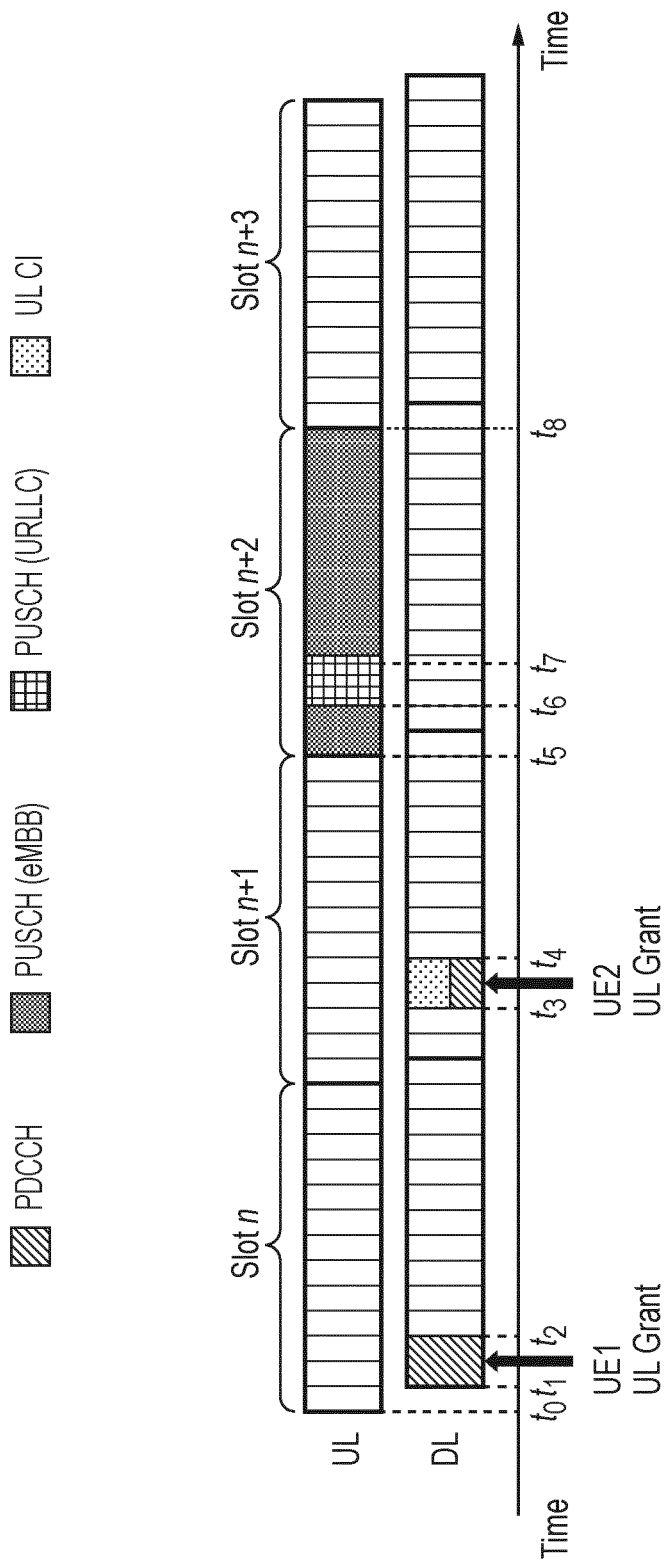
FIG. 6 shows an example of an uplink cancellation indicator (UL CI)

One of the features considered for Rel-16 eURLLC is Uplink Cancellation Indicator (UL CI). Similar to the DL PI, it is used to manage URLLC PUSCH transmission pre-empting a scheduled eMBB PUSCH transmission. An example is shown in FIG. 6, where UE1 with eMBB traffic receives an UL grant at time $t_1$ for a PUSCH transmission starting at time $t_5$ occupying the entire slot n+2. At time $t_3$, UE2 with UL URLLC traffic receives an UL grant for a PUSCH transmission at time $t_6$ occupying 2 symbols, where this transmission uses some of the resources originally scheduled for UE1. In order to ensure the reliability of UE2's URLLC PUSCH transmission, the gNB transmits an UL CI to UE1 at time $t_3$, indicating that its transmission has been pre-empted and that it should stop its PUSCH transmission so that it does not introduce any interference to UE2. It should be noted that unlike the downlink where the DL PI is transmitted after the pre-emption occurs, in the uplink the UL CI is transmitted before the pre-emption occurs so that the victim eMBB UE, e.g. UE1, is able to stop its PUSCH transmission.

Figure 7:
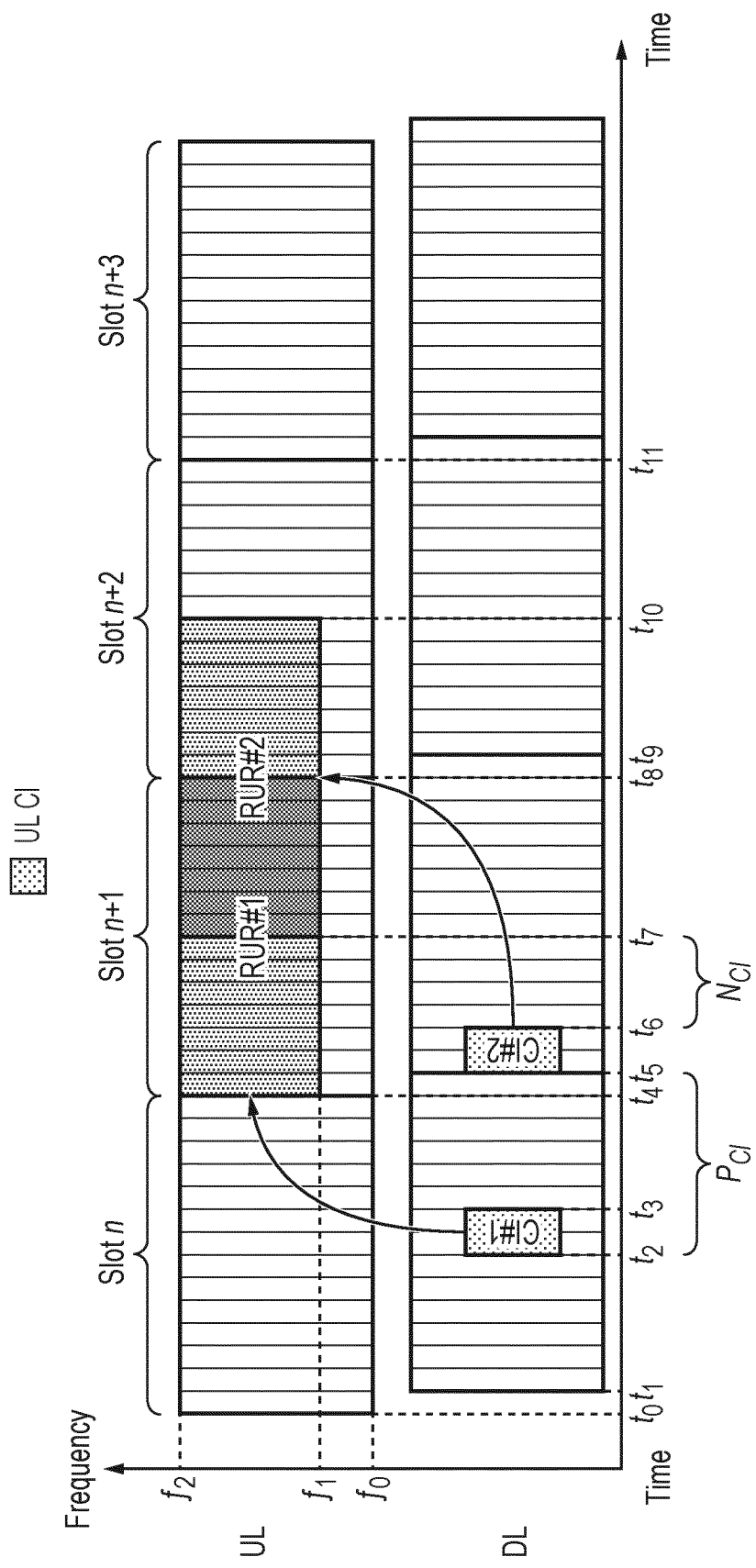
FIG. 7 shows an example of reference uplink regions (RURs) for UL CIs.

Similar to Downlink Pre-emption Indicators (DL PIs), each UL CI has a corresponding Reference Uplink Region (RUR) as shown in an example in FIG. 7. However, there are differences between RDR for DL PI and RUR for UL CI:

The RUR starts $N_{CI}$ symbols after the transmission of the Ul CI. In contrast, the RDR occurs before the DL PI. For example, as can be seen in FIG. 7, the Uplink Cancellation Indicator CI #1 is transmitted between time $t_2$ and $t_3$ and its corresponding Reference Uplink Region, RUR #1 starts $N_{CI}$ symbols later at time $t_4$ to $t_8$. $N_{CI}$ is the processing time of the UE to decode the UL CI;

The frequency domain of the RUR of an UL CI is configurable. In contrast, the RDR of a DL PI is equal to its DL BWP. In FIG. 6, the UL BWP is between $f_0$ to $f_2$ but the RUR for the UL CI can be configured to be less than the UL BWP, i.e. between $f_1$ and $f_2$; and The time domain, i.e. duration of the RUR of an UL CI is configurable. In contrast, the RDR of a DL PI is equal to the monitoring periodicity of the GC-DCI carrying the DL PI. Since the time domain of the RUR is configurable, it can be configured to be longer than the monitoring periodicity $P_{CI}$ of the GC-DCI carrying the UL CI, which will cause two successive RUR to overlap in time. For example in FIG. 6, the duration of the RUR is configured to be 14 symbols but $P_{CI}$ is configured to be 7 symbols, which causes two successive RUR, e.g. RUR #1 and RUR #2 to overlap in time between time $t_7$ and $t_8$. For DL PI, since the RDR duration is the same as the monitoring periodicity, there is no overlap between two successive RDR.

Figure 8:
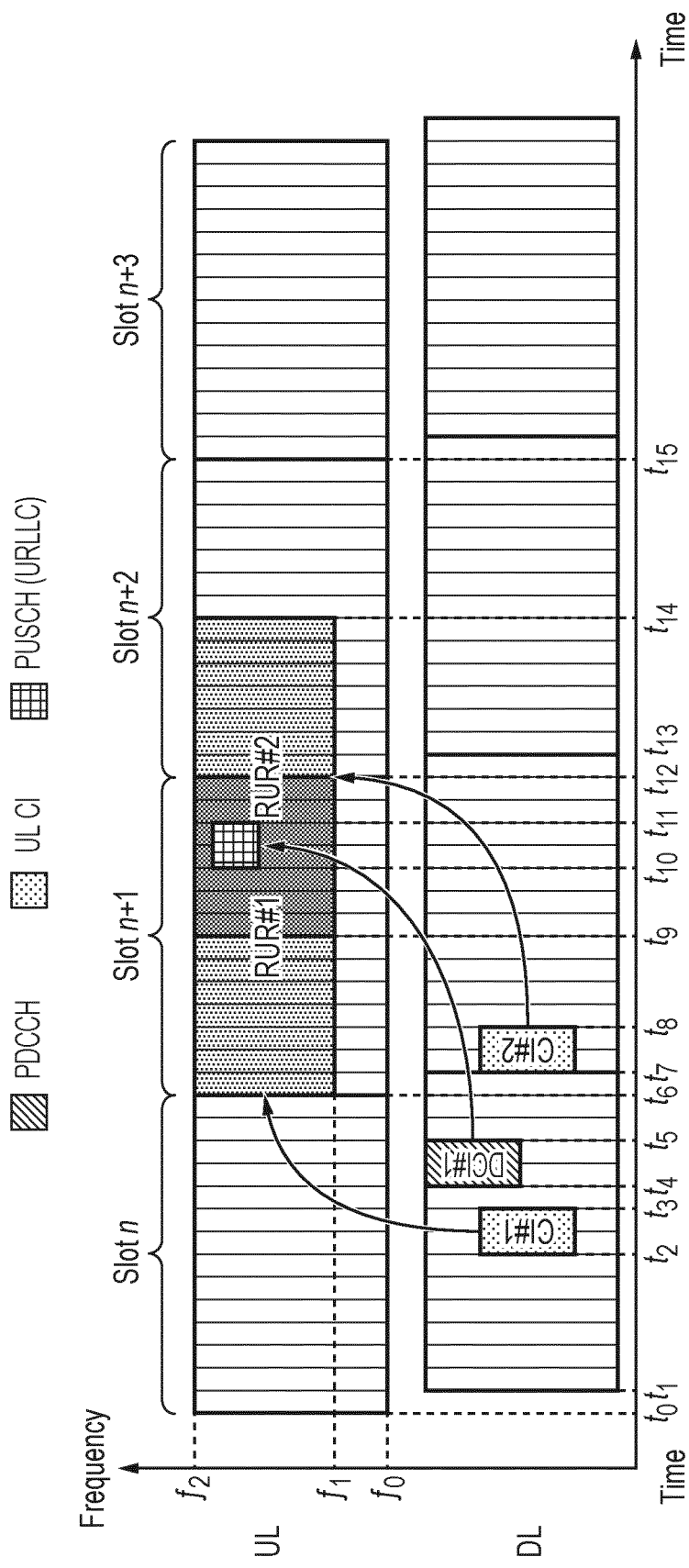
FIG. 8 shows an example of how a later UL CI may override a previous UL CI.

Since successive RUR can overlap in time, the UL CI may indicate contradictory pre-emption. For example, in FIG. 6, CI #1 may indicate that there is no pre-emption between time $t_7$ and $t_8$ of RUR #1 whilst CI #2 may indicate that there is a pre-emption between time $t_7$ and $t_8$ of RUR #2. It was proposed in [8] and [9] that the later UL CI can indicate portions in the overlapping regions—that were not indicated as pre-empted by the previous UL CI—as being pre-empted. However, the later UL CI cannot override portions in the overlapping regions—that were indicated as pre-empted by the previous UL CI—as being NOT pre-empted. This allows the gNB to schedule a URLLC transmission in the overlapping region after an UL CI has been transmitted and still able to indicate that region as being pre-empted using a later UL CI. An example is shown in FIG. 8, where CI #1, which is being monitored at time $t_2$ & $t_3$, does not indicate any pre-emption in RUR #1 (typically CI #1 is not transmitted in this case). At time $t_4$, DCI #1 schedules a URLLC PUSCH for a UE at time $t_{10}$ & $t_{11}$, which falls into RUR #1 but CI #1 can no longer indicate that portion as being pre-empted. Here, the gNB can use CI #2 to indicate that times $t_{10}$ & $t_{11}$ are being pre-empted in RUR #2.

Similar to DL PI, the UL CI uses a 2D bitmap to divide the RUR into time-frequency portions. In DL PI, 14 bits are used to represent either a 1×14 bitmap or 2×7 bitmap. For the UL CI, apart from 14 bits, other number of bits, e.g. 7 bits, 28 bits or 56 bits may be used to represent different dimensions, e.g. 2×14 bitmap, 4×14 bitmap, 8×7 bitmap, thereby giving finer granularity for each portion. In [10] it is proposed that the dimensions of the time-frequency portions in an RUR can be dynamically changed. For example, if 28 bits is configured for an UL CI, and the RUR duration is 14 symbols, the GC-DCI carrying the UL CI can also indicate one of multiple dimensions, e.g. it can use 2 bits to indicate one of four dimensions {2×14, 4×7, 7×4, 14×2} to be applied on the RUR.

Figure 9:
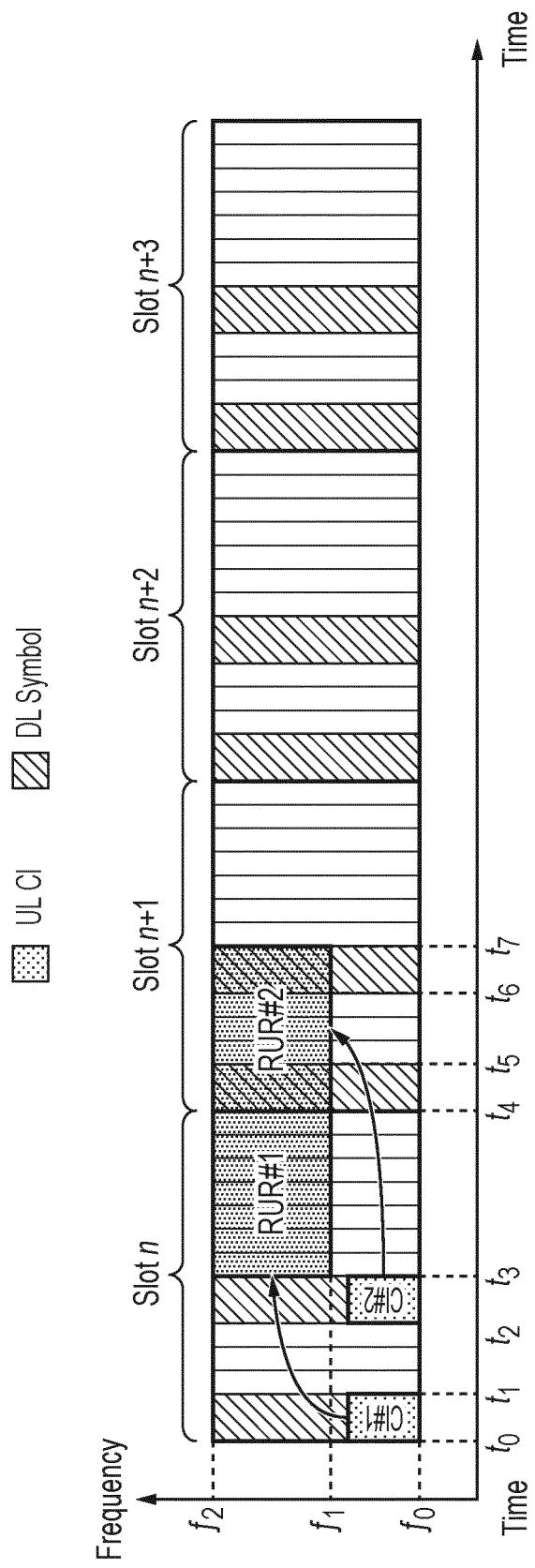
FIG. 9 illustrates an example of DL symbols falling within an RUR in accordance with a time division duplexing, TDD, operation.

Another aspect is that, for TDD operation, the RUR map overlap with DL symbols, where uplink transmission is not possible. It has been suggested in [11] that these DL symbols are excluded from the RUR thereby improving the granularity of each time portion of the RUR. The DL symbols within an RUR can be different for different UL CI. For example, as can be seen in FIG. 9, CI #1 associated RUR #1 is between time $t_3$ and $t_4$ which does not collide with any DL symbols. CI #2 associated RUR #2 is between time $t_4$ and $t_7$ and collides with DL symbols between time $t_4$ & $t_5$ and between time $t_6$ & $t_7$.

It is recognised that the time-frequency portion dimension and therefore the granularity of each of the portions can change. Embodiments of the present disclosure therefore provide methods to re-interpret the time-frequency portion granularity of an RUR based on the conditions it is in. Specifically, embodiments of the present disclosure propose that the time-frequency portion granularity of an RUR may be re-interpreted based on the condition of the RUR.

Changing Granularity in RUR—Overlapping RURs

One such condition of the RUR is that two RURs overlap in time (and in frequency), and the granularity of the overlap region is therefore re-defined. When two RURs overlap in time, the time-frequency portions that are indicated as being pre-empted are combined, and the manner of this combination is dependant on the dimensions of the two RURs.

Figure 10:
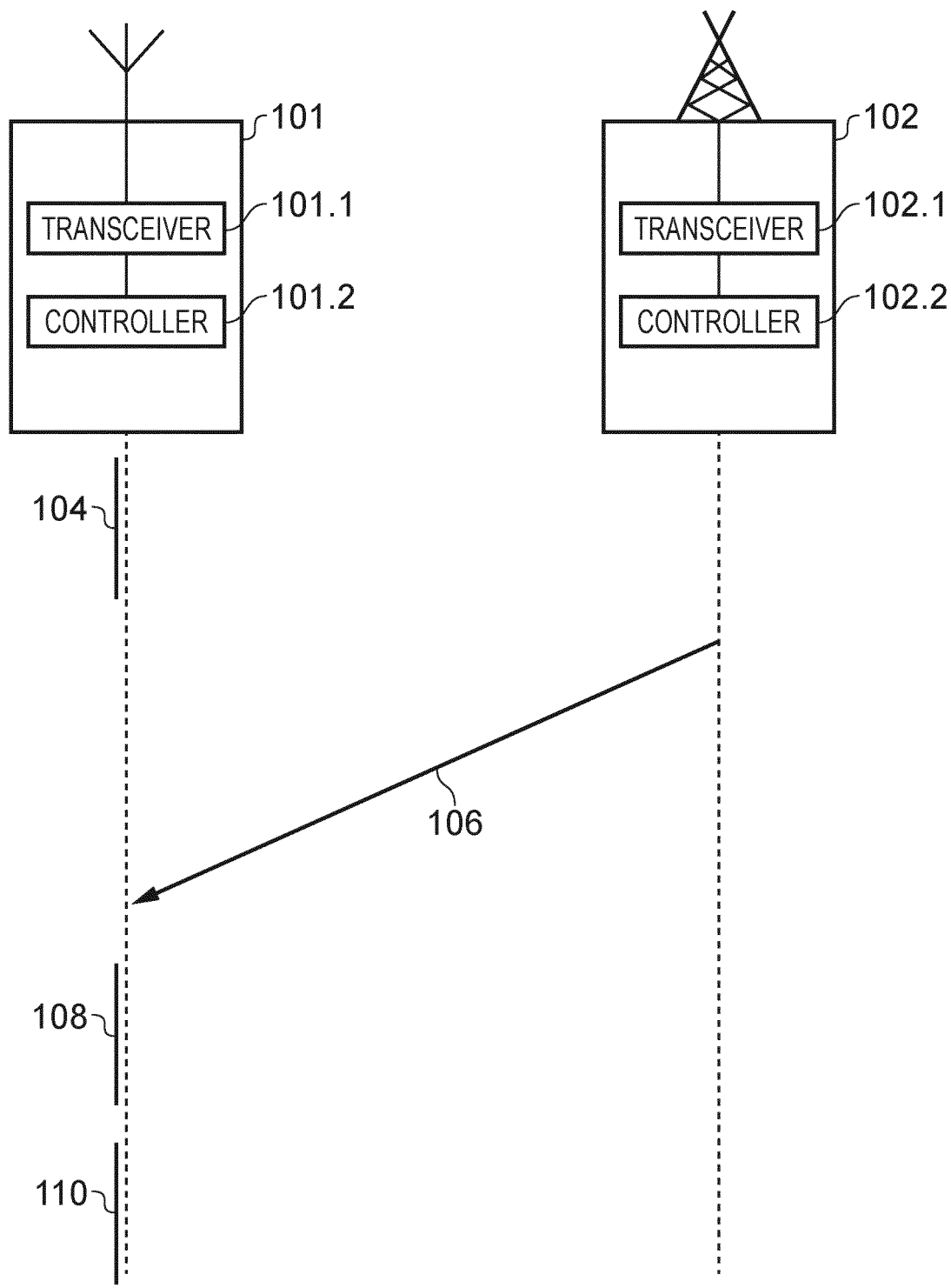
FIG. 10 is a first example part schematic representation, part message flow diagram of communications between a communications device and an infrastructure equipment of a wireless communications network in accordance with embodiments of the present technique.

FIG. 10 provides a first part schematic representation, part message flow diagram of communications between a communications device or UE 101 and an infrastructure equipment or base station/eNodeB/gNodeB 102 forming part of a radio access network of a wireless communications network in accordance with embodiments of the present technique. The communications device 101 comprises a transceiver (or transceiver circuitry) 101.1 configured to transmit signals to the wireless communications network (specifically to the infrastructure equipment 102) via a wireless access interface provided by the wireless communications network, and/or to receive signals from the wireless communications network (specifically from the infrastructure equipment 102) via the wireless access interface, and a controller (or controller circuitry) 101.2 configured to control the transceiver circuitry 101.1 to transmit or to receive the signals. As can be seen in FIG. 10, the infrastructure equipment 102 also comprises a transceiver (or transceiver circuitry) 102.1 configured to transmit signals to the communications device 101 (which may be one of a plurality of communications devices) via the wireless access interface and/or to receive signals from the communications device 101 via the wireless access interface, and a controller (or controller circuitry) 102.2 configured to control the transceiver circuitry 102.1 to transmit or to receive the signals. Each of the controllers 101.2, 102.2 may be, for example, a microprocessor, a CPU, or a dedicated chipset, etc.

The controller circuitry 101.2 of the communications device 101 is configured in combination with the transceiver circuitry 101.1 of the communications device 101 to determine 104 uplink communications resources of the wireless access interface to be used for the transmission of data by the communications device 101, to receive 106 (for example, from the infrastructure equipment 102) a plurality of uplink cancellation indicators that each indicate that at least a portion of the uplink communications resources is allocated for the transmission of signals by another communications device and is located within communications resources of one of a plurality of reference regions, each of the reference regions being associated with one of the uplink cancellation indicators, to determine 108 that a portion of a first of the reference regions overlaps in both of frequency and time with a portion of a second of the reference regions, the portion of the uplink communications resources located within the communications resources of the first reference region being a first portion of the uplink communications resources and the portion of the uplink communications resources located within the communications resources of the second reference region being a second portion of the uplink communications resources, and to determine 110, in accordance with dimensions of the first reference region and dimensions of the second reference region, that at least a third portion of the uplink communications resources is allocated for the transmission of signals by another communications device.

Here, in at least some embodiments of the present technique, both in relation to those described by way of FIG. 10 above and FIG. 13 below, each of the uplink cancellation indicators comprises a bitmap comprising a plurality of bits each representing a sub-region (see for example FIGS. 4A and 4B) of the communications resources of the reference region associated with the uplink cancellation indicator, wherein a value of each of the one or more bits indicates whether or not the sub-region of the communications resources of the reference region associated with that bit comprises at least the portion of the uplink communications resources, indicated by the uplink cancellation indicator, that are allocated for the transmission of signals by the other communications device.

In an arrangement of embodiments the present technique, if the time-frequency portions of the two overlapping RURs have different dimensions and if the time-frequency portions indicated as being pre-empted collides, then the actual pre-emption are the portions that overlap. In other words, the communications device is configured to determine that the dimensions of the first reference region are different to the dimensions of the second reference region, to determine that the at least the third portion of the uplink communications resources comprises parts of either of the at least the first portion of the uplink communications resources and the at least the second portion of the uplink communications resources that do not overlap with any parts of the other of the at least the first portion of the uplink communications resources and the at least the second portion of the uplink communications resources and that are located within the portion of the first reference region and the portion of the second reference region that overlap in both of frequency and time, and to determine that the at least the third portion of the uplink communications resources further comprises all parts of the at least the first portion of the uplink communications resources and the at least the second portion of the uplink communications resources that occupy the same communications resources in frequency and time as each other and that are located within the portion of the first reference region and the portion of the second reference region that overlap in both of frequency and time. That is, the granularity in the overlapping region adopts the finer granularity of each of the time/frequency domain of each RUR. This would enable the gNB to indicate a finer granularity on the resources being pre-empted thereby minimising ghost pre-emption.

Figure 11:
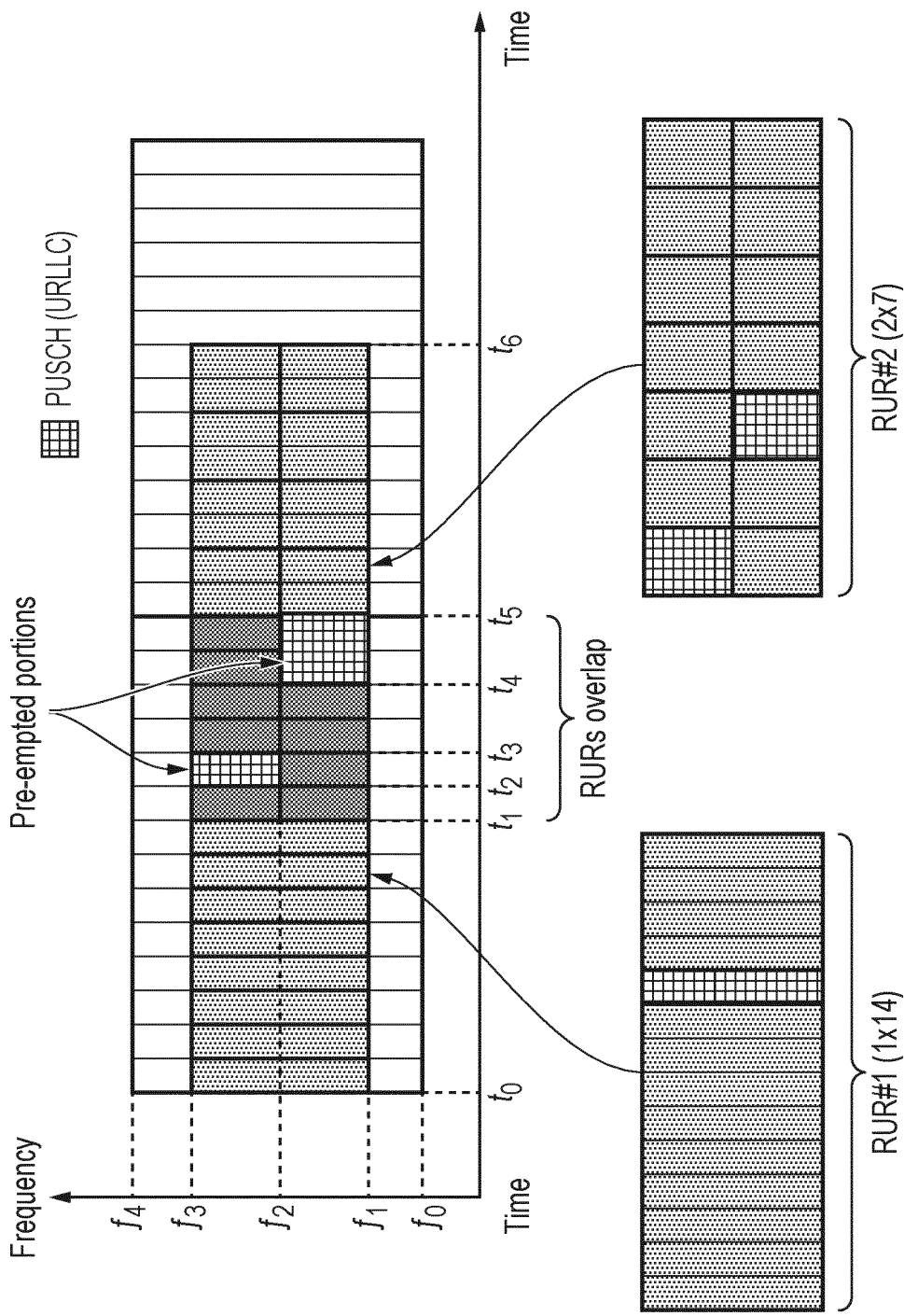
FIG. 11 shows an example of how overlapping RURs with different dimensions may be dealt with in accordance with embodiments of the present technique.

Such an arrangement is better explained using an example in FIG. 11, where there are two successive RURs, namely RUR #1 occupying time $t_0$ to $t_5$ & frequency $f_1$ to $f_3$ and RUR #2 occupying time $t_1$ to $t_6$ & frequency $f_1$ to $f_3$. RUR #1 and RUR #2 overlap between time $t_1$ to $t_5$. The time-frequency portions of RUR #1 has dimension 1×14 and that of RUR #2 has dimension 2×7. RUR #1 indicates portion between time $t_2$ to $t_3$ and frequency $f_1$ to $f_3$ as being pre-empted. RUR #2 indicates two portions, one between time $t_1$ to $t_3$ & frequency $f_2$ to $f_3$ and another between time $t_4$ to $t_5$ & frequency $f_1$ to $f_2$, as being pre-empted. When the indications of RUR #1 & RUR #2 combined, the portion between time $t_4$ to $t_5$ & frequency $f_1$ to $f_2$ has no overlap and so that entire portion is deemed to be pre-empted. However, the other portions overlap and as per this arrangement, only the overlapped region is considered pre-empted. That is, the region between time $t_2$ to $t_3$ & frequency $f_2$ to $f_3$ is being pre-empted. This arrangement recognises that the granularity of a time-frequency portion may be too coarse to indicate the actual pre-empted resources. This arrangement also recognises that changing the dimensions of the RUR would change the granularity of the time-frequency portion. By taking the overlapping region of two colliding pre-empted portions from two RURs of different dimension, it is possible to benefit from the finer granularity of the combined RURs. That is, RUR #1 has finer granularity in the time domain, where a time portion is 1 symbol, but it has coarse granularity in the frequency domain, and so it is unable to pinpoint the actual pre-empted region. On the other hand, RUR #2 has finer frequency granularity but coarse time granularity (2 symbols) and so it could pinpoint a more accurately frequency resource that is pre-empted. By combining and taking the overlapping parts of these the pre-empted portions of these two RURs, the gNB can indicate a more accurate pre-empted region in time and frequency, thereby reducing ghost pre-emption, which is not feasible using either of the RURs alone.

In another arrangement of embodiments of the present technique, if the time-frequency portions of the two overlapping RURs have the same dimensions, then the portions indicated as being pre-empted are super-imposed and the granularity is not changed. In other words, the communications device is configured to determine that the dimensions of the first reference region are the same as the dimensions of the second reference region, and to determine that the at least the third portion of the uplink communications resources consists of all parts of each of the at least the first portion of the uplink communications resources and the at least the second portion of the uplink communications resources that are located within the portion of the first reference region and the portion of the second reference region that overlap in both of frequency and time.

Figure 12:
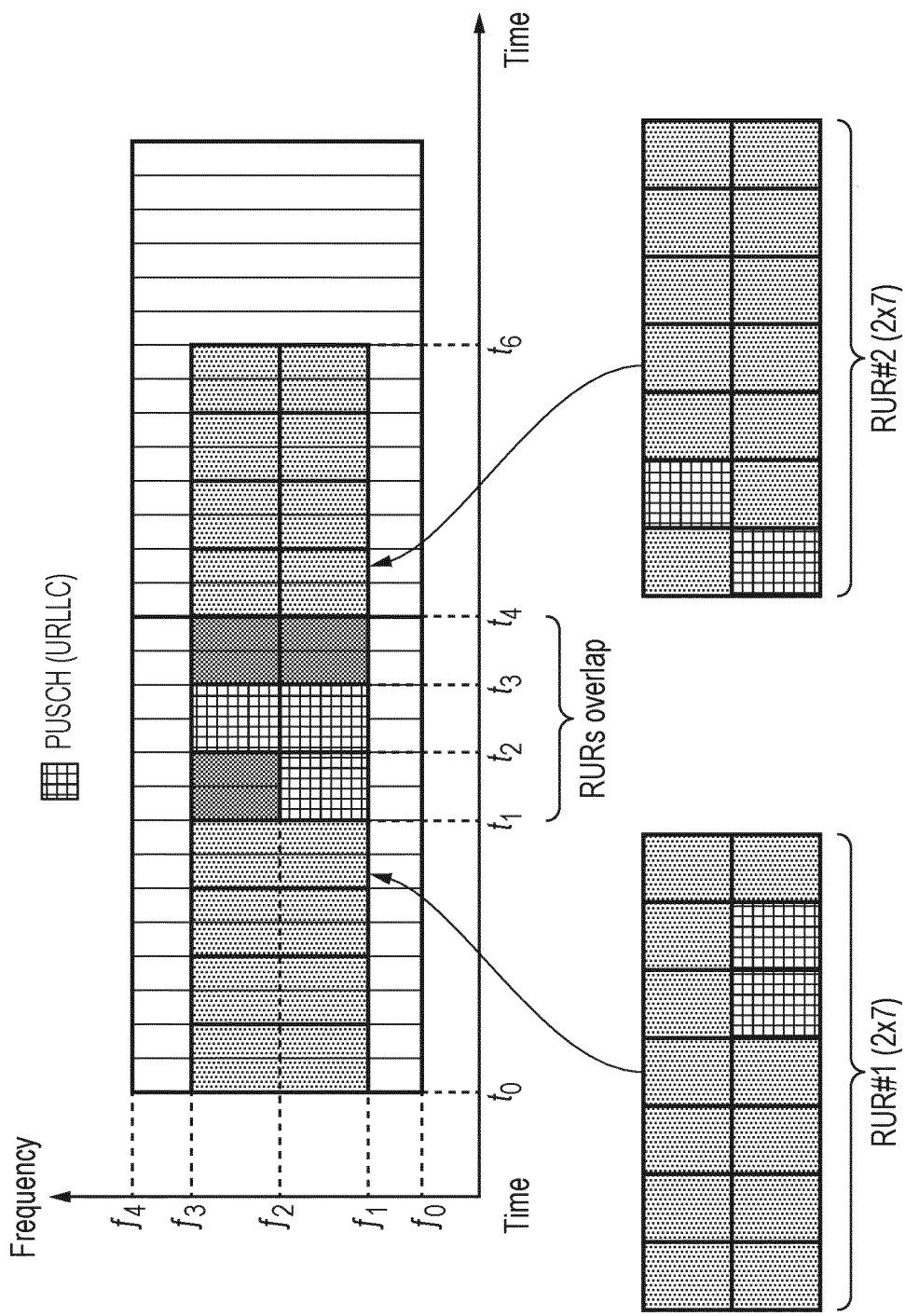
FIG. 12 shows an example of how overlapping RURs with the same dimensions may be dealt with in accordance with embodiments of the present technique.

An example of this arrangement is shown in FIG. 12, where an UL CI is configured using 14 bits to represent a time-frequency portion with dimensions 2×7. The RUR has a time duration of 14 symbols and ranges from frequency $f_1$ to $f_3$. The periodicity of the UL CI is such that two successive RURs overlap by 6 symbols, as shown in FIG. 12, where RUR #1 spans time $t_0$ to $t_4$ and RUR #2 spans time $t_1$ to $t_5$ overlaps between time $t_1$ and $t_4$. RUR #1 indicates that the portions between time $t_1$ and $t_3$ and frequency $f_1$ to $f_2$ are pre-empted. RUR #2 indicates that two portions, i.e., one portion between time $t_1$ & $t_2$ with frequency $f_1$ to $f_2$ and another portion between time $t_2$ & $t_3$ with frequency $f_2$ & $f_3$, are pre-empted. As per this arrangement, the pre-emption portions are the superposition of those indicated by RUR #1 and RUR #2, i.e. the two portions from time $t_1$ to $t_3$ & frequency $f_1$ to $f_2$ and the portion from time $t_2$ to $t_3$ & frequency $f_2$ to $f_3$.

Changing Granularity in RUR—Collision with DL Symbols

A second such condition of the RUR is that there is collision between the RUR and DL symbols in a TDD system. As described above, for TDD systems, there have been previously made proposals to exclude DL symbols from the RUR. This means that the "active" RUR region would be reduced, resulting in a finer time-frequency portion granularity. Some embodiments of the present technique provide solutions and methods by which such finer time-frequency granularity could be achieved.

Figure 13:
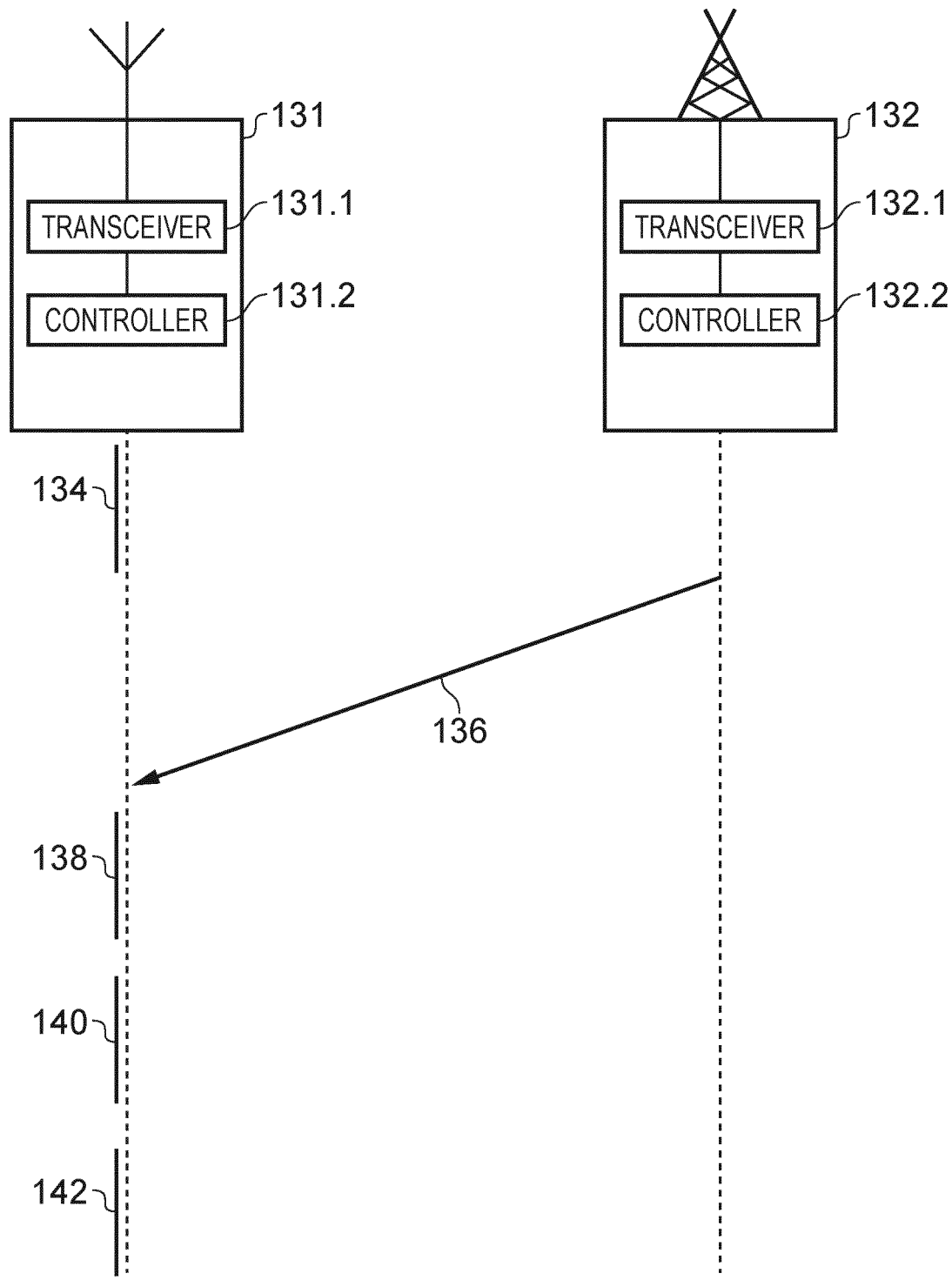
FIG. 13 is a second example part schematic representation, part message flow diagram of communications between a communications device and an infrastructure equipment of a wireless communications network in accordance with embodiments of the present technique.

FIG. 13 provides a second part schematic representation, part message flow diagram of communications between a communications device or UE 131 and an infrastructure equipment or base station/eNodeB/gNodeB 132 forming part of a radio access network of a wireless communications network in accordance with embodiments of the present technique. The communications device 131 comprises a transceiver (or transceiver circuitry) 131.1 configured to transmit signals to the wireless communications network (specifically to the infrastructure equipment 132) via a wireless access interface provided by the wireless communications network, and/or to receive signals from the wireless communications network (specifically from the infrastructure equipment 132) via the wireless access interface, and a controller (or controller circuitry) 131.2 configured to control the transceiver circuitry 131.1 to transmit or to receive the signals. As can be seen in FIG. 13, the infrastructure equipment 132 also comprises a transceiver (or transceiver circuitry) 132.1 configured to transmit signals to the communications device 131 (which may be one of a plurality of communications devices) via the wireless access interface and/or to receive signals from the communications device 131 via the wireless access interface, and a controller (or controller circuitry) 132.2 configured to control the transceiver circuitry 132.1 to transmit or to receive the signals. Each of the controllers 131.2, 132.2 may be, for example, a microprocessor, a CPU, or a dedicated chipset, etc.

The controller circuitry 131.2 of the communications device 131 is configured in combination with the transceiver circuitry 131.1 of the communications device 131 to determine 134 uplink communications resources of the wireless access interface to be used for the transmission of data by the communications device 131, to receive 136 (e.g. from the infrastructure equipment 132) an uplink cancellation indicator that indicates that at least a portion of the uplink communications resources is allocated for the transmission of signals by another communications device and is located within communications resources of a reference region associated with the uplink cancellation indicator, the reference region being formed of a specified number of sub-regions, to determine 138 that an overlapping portion of the reference region overlaps in both of frequency and time with a region of the wireless access interface that is dedicated for downlink transmissions, to determine 140 that one or more of the sub-regions that are at least partially located within the overlapping portion of the reference region are to be excluded from the reference region, and to repartition 142 at least one of the sub-regions that are not to be excluded from the reference region to form smaller sub-regions such that, after the adjustment, the number of sub-regions that are not to be excluded from the reference region is equal to the specified number of sub-regions.

Figure 14:
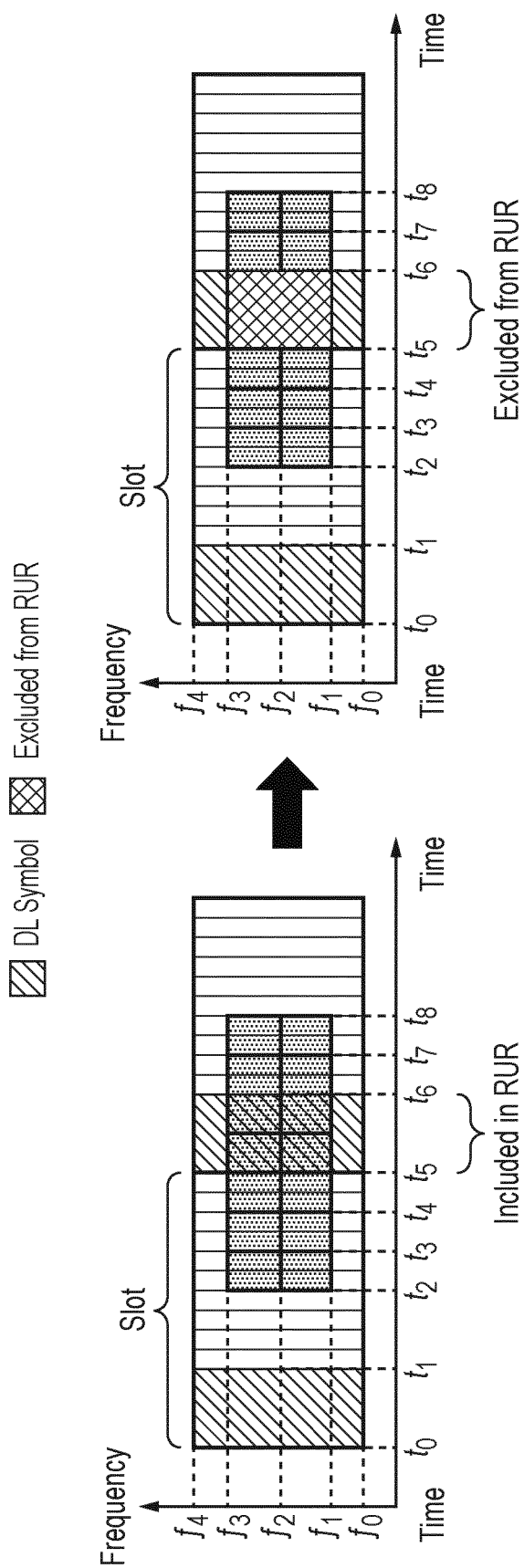
FIG. 14 shows an example of how DL symbols may be excluded from an RUR in accordance with embodiments of the present technique.

An example of such operation as described above with respect to FIG. 13 is shown in FIG. 14, where there is an RUR with dimensions 2×7 with duration of 14 symbols giving a time portion granularity of 2 symbols. On the left hand side of FIG. 14, this RUR collides with DL symbols between time $t_5$ to $t_6$. The time portion granularity of the RUR is 2 symbols but the portion between time $t_5$ to $t_6$ is redundant since it is already understood that no uplink transmission can occur there. On the right hand side of FIG. 14, the DL symbols are excluded from the RUR. Since there are 7 time portions in the RUR, some of these portions can have a finer granularity (1 symbol). That is, the time portion of the RUR is repartitioned such that the portions between time $t_6$ to $t_8$ have a time portion granularity of 1 symbol instead of 2 symbols. Using a finer granularity would reduce ghost pre-emption, which is beneficial. In other words, the communications device is configured to repartition the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned.

Figure 15:
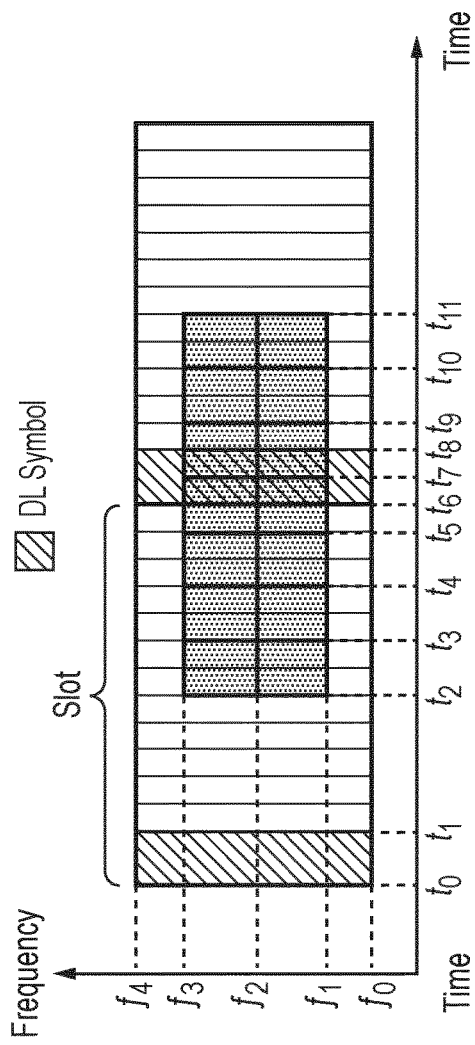
FIG. 15 shows an example of how excluding DL symbols from an RUR may not improve the time portion granularity of the RUR in accordance with embodiments of the present technique.

In an arrangement of embodiments of the present technique, only DL symbols that completely collide with a time portion are excluded from the RUR. Otherwise these DL symbols are included. In other words, the one or more sub-regions that are to be excluded from the reference region are fully located within the overlapping portion of the reference region. This recognises that if a time portion is only partially occupied by DL symbols, then excluding these DL symbols would not improve the time portion granularity since a bit is still required to represent this time portion. Another way to describe this is that only whole time-frequency portions can be excluded from the RUR in order to benefit from improved granularity. For example, as shown in FIG. 15, a 2×7 RUR with duration of 14 symbols occupies time $t_2$ to $t_{11}$ where it collides with DL symbols between time $t_6$ to $t_8$. The DL symbol between time $t_6$ & $t_7$ partially collides with the time portion between time $t_5$ to $t_7$ and since it is known that the DL symbol cannot be used for uplink transmission, this time portion effectively has a time portion granularity of 1 symbol (instead of 2 symbol). Hence, excluding the DL symbol from the RUR does not improve the time portion granularity. Of course, the 1 symbol time portion granularity can be redistributed to other portions in the RUR, but this still does not improve the overall time granularity. Similarly, the time portion between time $t_7$ to $t_9$ partially collides with DL symbol between time $t_7$ & $t_8$ and therefore has a time portion granularity of 1 symbol. Basically, a time portion that partially collides with DL symbol would in effect have a time portion granularity that is finer and so excluding this DL symbol has no effect on the overall time portion granularity of the RUR. On the other hand, if the DL symbol fully collides with a time portion as shown in FIG. 14, then excluding these DL symbols would improve the granularity of the remaining RUR.

Figure 16:
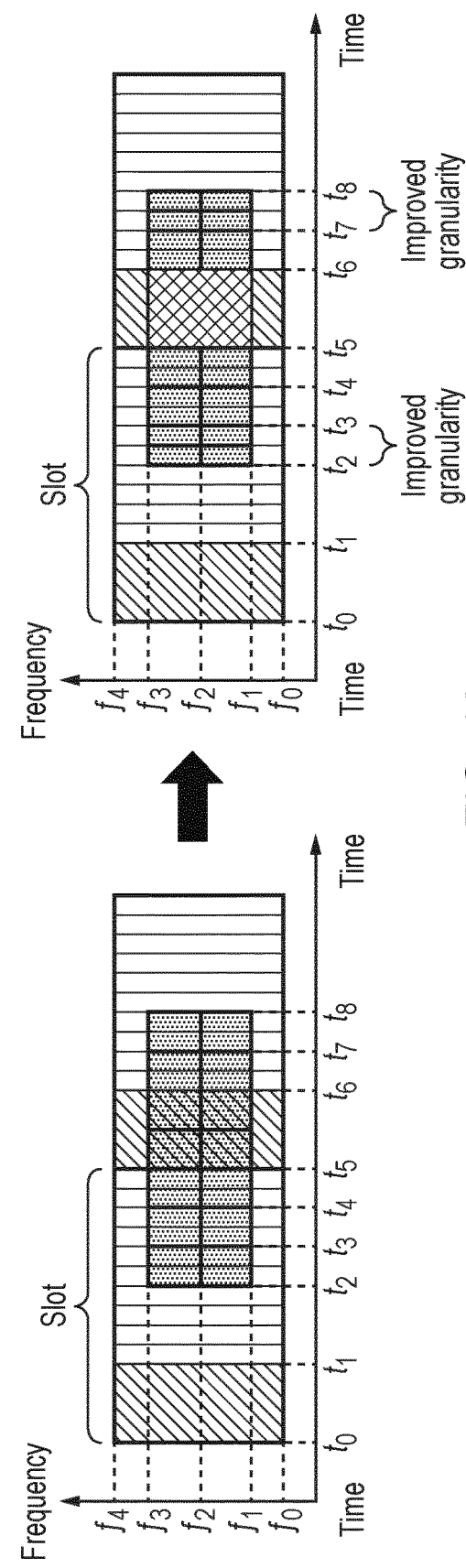
FIG. 16 shows an example of how the start and end portions of an RUR may have improved time granularity in accordance with embodiments of the present technique.

In an arrangement of embodiments of the present technique, when DL symbols are excluded from the RUR, the re-partition of the time portion is such that the two opposite ends of the RUR have finer granularity. In other words, one or more of the repartitioned sub-regions are located at the temporal start of the reference region and the others of the repartitioned sub-regions are located at the temporal end of the reference region. An example is shown in FIG. 16, where a 2×7 RUR with duration of 14 symbols occupies time $t_2$ to $t_8$. The RUR collides with DL symbols at time $t_5$ to $t_6$ and the corresponding two time portions between $t_5$ to $t_6$ are excluded from the RUR. As per this arrangement, the time portions at both opposite ends time portion are improved, i.e. the first two time portions between time $t_2$ to $t_3$ have 1 symbol granularity instead of 2 symbols and the last two time portions between time $t_7$ to $t_8$ have 1 symbol granularity instead of 2 symbols. As per a previously described arrangement above, ghost pre-emption is reduced if overlapping RURs have different granularities/dimensions and since opposite ends of the RUR are likely to overlap with other RURs, their granularities are changed to benefit from this feature.

Figure 17:
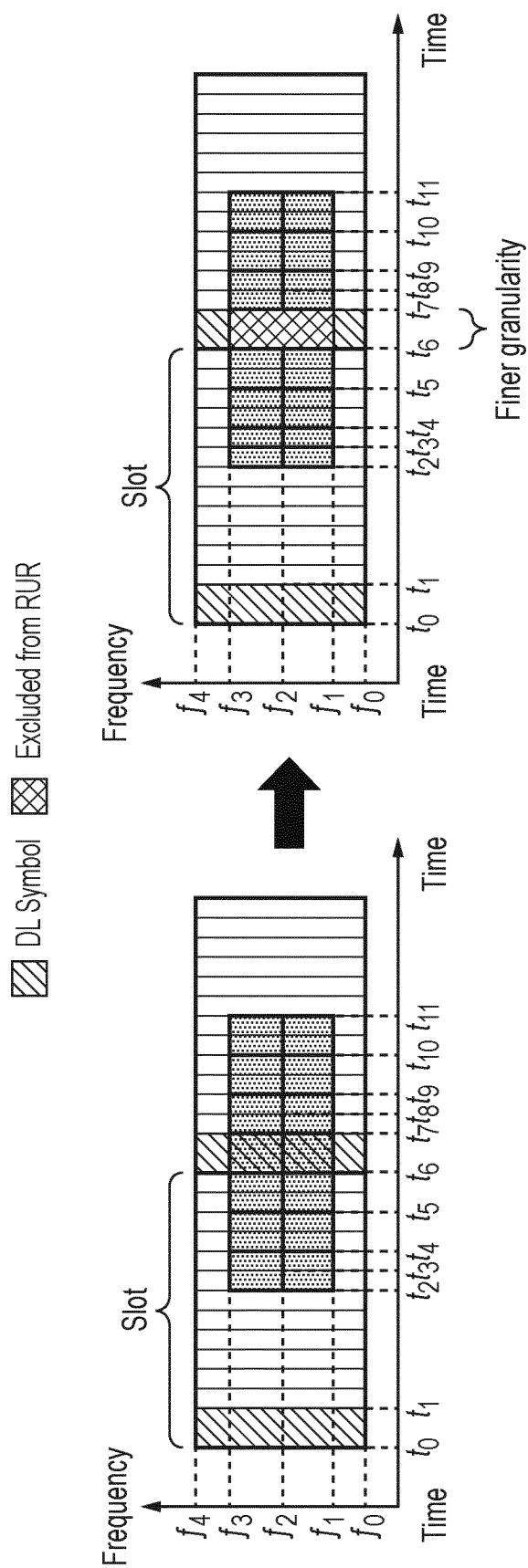
FIG. 17 shows an example of how the earlier portions of an RUR may have improved time granularity in accordance with embodiments of the present technique.

In an arrangement of embodiments of the present technique, when DL symbols are excluded from the RUR, the re-partition of the time portion is such that the earlier time portions of the RUR have finer granularity. In other words, all of the repartitioned sub-regions are located at the temporal start of the reference region. An example is shown in FIG. 17, where the time portion colliding with DL symbols between time $t_6$ to $t_7$ is excluded from the RUR. The spare indicator is then used to improve the time granularity of the earlier portions, between time $t_2$ to $t_4$.

In an arrangement of embodiments of the present technique, when DL symbols are excluded from the RUR, the re-partition of the time portion is such that the later time portions of the RUR have finer granularity. In other words, all of the repartitioned sub-regions are located at the temporal end of the reference region.

Figure 18:
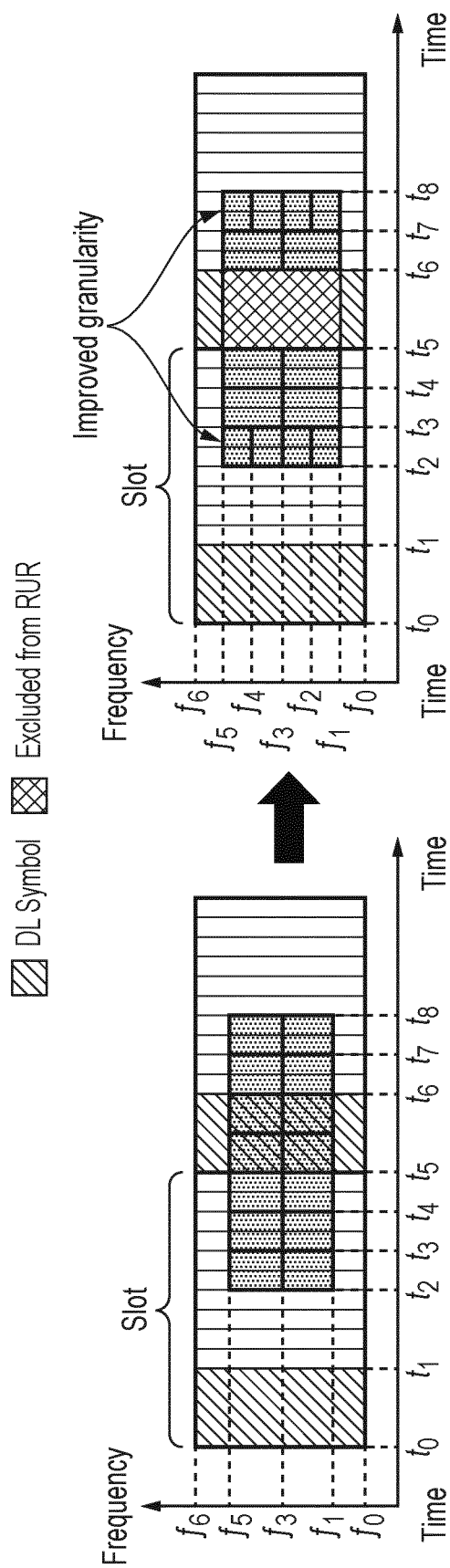
FIG. 18 shows an example of how portions of the RUR may have improved frequency granularity in accordance with embodiments of the present technique.

In another arrangement of embodiments of the present technique, the spare indications from excluding time portions that fully overlaps with DL portions are used to improve the frequency portion granularity. In other words, the communications device is configured to repartition each of the repartitioned sub-regions in frequency, such that the repartitioned sub-regions occupy a same time period as the sub-regions that are not repartitioned, and such that the repartitioned sub-regions occupy a smaller frequency band than the sub-regions that are not repartitioned. In previously described arrangements above, only the time portion granularity is improved. This arrangement recognises that the spare indication can also be used to improve the frequency portion granularity. An example is shown in FIG. 18, where 2×7 RUR with duration of 14 symbols occupies time $t_2$ to $t_8$. The RUR collides with DL symbols at time $t_5$ to $t_6$ and the corresponding two time portions between $t_5$ to $t_6$ are excluded from the RUR (right hand side in FIG. 18). Here the time-frequency portions between time $t_2$ to $t_3$ and between $t_7$ to $t_8$ have finer frequency granularities. It should be appreciated by those skilled in the art that, although the finer frequency granularities are shown at either end portions of the RUR, they can all be at the start, or can be located anywhere within the RUR. Those skilled in the art that the same is true for the above described arrangements where the time portion granularity of the RUR is improved.

In another arrangement of embodiments of the present technique, when time portions collide with DL symbols are excluded, the spare indicators are used to improve frequency portion granularity if the time portion granularity cannot be improved further (e.g. 1 symbol). In other words, the communications device is configured to repartition each of the repartitioned sub-regions in frequency dependent on determining that the repartitioned sub-regions cannot be divided (or further reduced) in time. For example, if the RUR has time-frequency portion dimension 1×14 and a duration of 14 symbols, then the time portion granularity is 1 symbol and cannot be further reduced. It is therefore beneficial to use the extra indications to have more partition in the frequency domain. In other words, the time portion granularity is improved first followed by frequency portion.

In another arrangement of embodiments of the present technique, whether the time portion or frequency portion granularity is improved is configured the network, e.g. by RRC or indicated in the DCI. In other words, the communications device is configured to receive a control signal, the control signal providing an indication of whether the communications device is either to repartition each of the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned, or to repartition each of the repartitioned sub-regions in frequency, such that the repartitioned sub-regions occupy a same time period as the sub-regions that are not repartitioned, and such that the repartitioned sub-regions occupy a smaller frequency band than the sub-regions that are not repartitioned In a TDD system, the DL symbols can be:
Semi-statically configured using RRC, i.e. semi-static DL symbols;
A symbol can be semi-statically configured as Flexible, i.e. semi-static Flexible symbol. A semi-static Flexible symbol can be dynamically indicated by a dynamic SFI (Slot Format Indicator) to be DL symbol. The SFI is carried by Group Common DCI with Format 2_0; or
A DL Grant can schedule PDSCH to occupy semi-static Flexible symbols, which implicitly indicates that these semi-static Flexible symbols are used as DL symbols.

The previously described arrangements of embodiments of the present technique are applicable to all types of DL symbols regardless how it is derived. In another arrangement of embodiments of the present technique, only semi-static DL symbols can be excluded from the RUR. In other words, the one or more sub-regions that are to be excluded from the reference region are located within one or more parts of the overlapping portion of the reference region that consist of semi-statically configured downlink symbols.

This is because semi-static DL symbols are reliably known to the UE as the UE may misdetect or miss the detection an SFI.

It should be appreciated that the above-described embodiments of the present disclosure may be combined in any feasible way. For example, it is possible for a communications device to operate in accordance with both of the operations as described by way of FIGS. 10 and 13 at the same time. Taking the example operation of FIG. 10 as described above, the communications device 101 may further be configured to determine that an overlapping portion of one of the reference regions overlaps in both of frequency and time with a region of the wireless access interface that is dedicated for downlink transmissions, the one of the reference regions being formed of a specified number of sub-regions, to determine that one or more of the sub-regions that are at least partially located within the overlapping portion of the one of the reference regions are to be excluded from the one of the reference regions, and to repartition at least some of the sub-regions that are not to be excluded from the one of the reference regions to form smaller sub-regions such that, after the adjustment, the number of sub-regions that are not to be excluded from the one of the reference regions is equal to the specified number of sub-regions. Here, those skilled in the art would appreciate that the one of the reference regions for which sub-regions are either excluded or repartitioned/divided, may be either of the first or second reference regions as described with respect to FIG. 10, or may be a different reference region that is not either of the first or second reference regions. Those skilled in the art would further appreciate that repartitioning as used herein may refer to dividing a sub-region in half or by some other amount in at least one of time or frequency. Alternatively, it would be understood that repartitioning may refer to, for example, increasing the size of a sub-region from two symbols to three symbols in the time domain, but reduce its size in the frequency domain Additionally, repartitioning could refer to effecting a change on a multiple sub-regions; for example, two sub-regions of three symbols in the time domain between frequencies $f_1$ and $f_2$ and $f_2$ and $f_3$ respectively could each be repartitioned into three sub-regions each extending between $f_1$ and $f_3$ but covering only one symbol in the time domain.

Flow Diagram Representation

Figure 19:
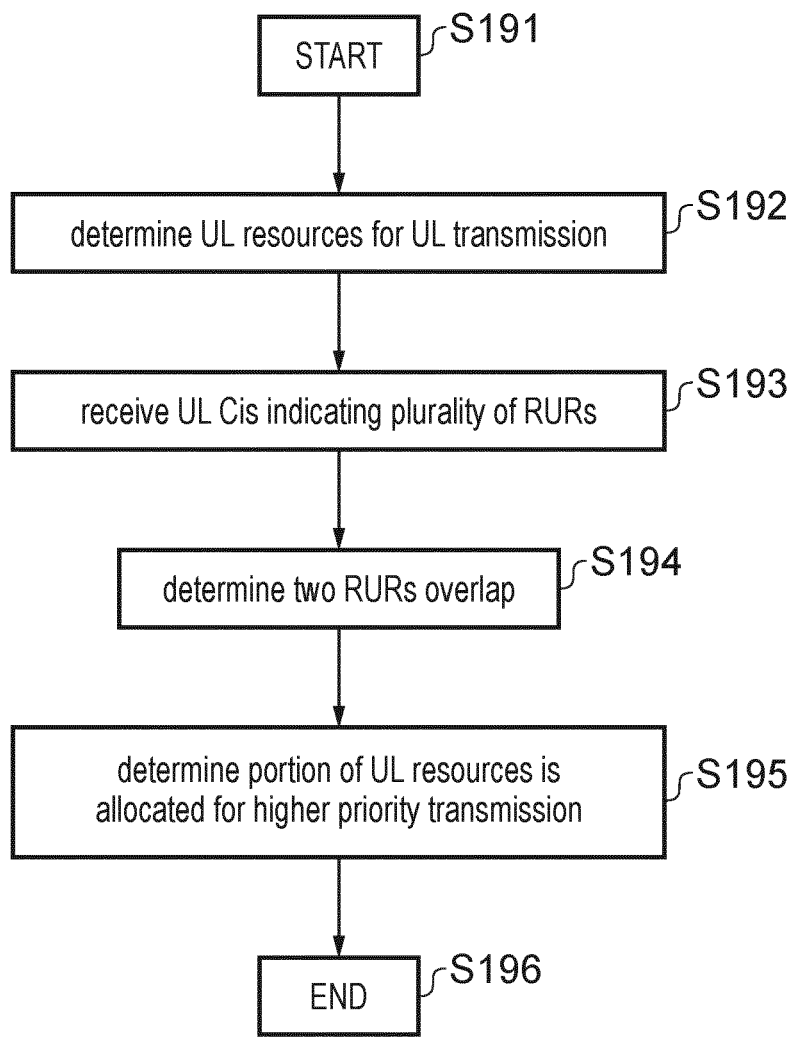
FIG. 19 shows a flow diagram illustrating a first process of communications between a communications device and an infrastructure equipment in accordance with embodiments of the present technique.

FIG. 19 shows a flow diagram illustrating a first process of communications between a communications device and a wireless communications network in accordance with embodiments of the present technique. The method is a method of operating the communications device, which is configured to transmit signals to or receive signals from a wireless communications network.

The method begins in step S191. The method comprises, in step S192, determining uplink communications resources of a wireless access interface of the wireless communications network to be used for the transmission of data by the communications device. The process then comprises in step S193, receiving a plurality of uplink cancellation indicators that each indicate that at least a portion of the uplink communications resources is allocated for the transmission of signals by another communications device and is located within communications resources of one of a plurality of reference regions, each of the reference regions being associated with one of the uplink cancellation indicators. In step S194, the process involves determining that a portion of a first of the reference regions overlaps in both of frequency and time with a portion of a second of the reference regions, the portion of the uplink communications resources located within the communications resources of the first reference region being a first portion of the uplink communications resources and the portion of the uplink communications resources located within the communications resources of the second reference region being a second portion of the uplink communications resources. The method then involves, in step S195, determining, in accordance with dimensions of the first reference region and dimensions of the second reference region, that at least a third portion of the uplink communications resources is allocated for the transmission of signals by another communications device. The process ends in step S196.

Figure 20:
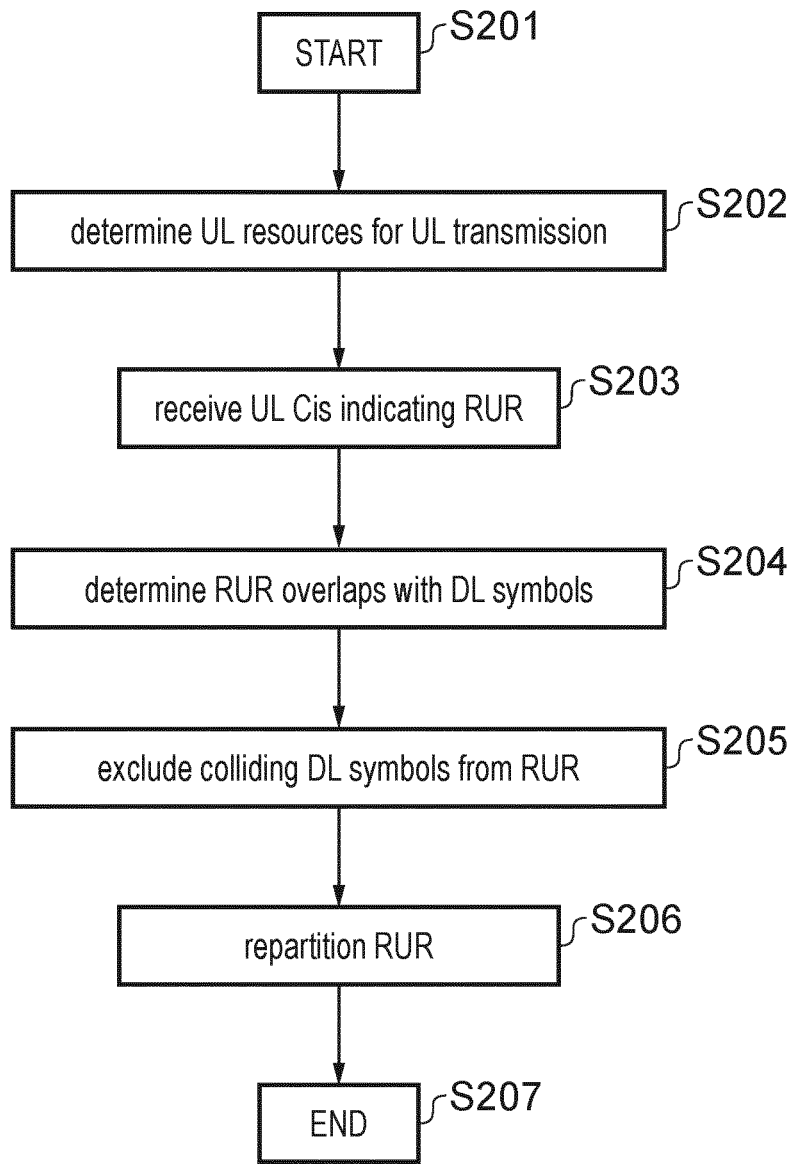
FIG. 20 shows a flow diagram illustrating a second process of communications between a communications device and an infrastructure equipment in accordance with embodiments of the present technique.

FIG. 20 shows a flow diagram illustrating a second process of communications between a communications device and a wireless communications network in accordance with embodiments of the present technique. The method is a method of operating the communications device, which is configured to transmit signals to or receive signals from a wireless communications network.

The method begins in step S201. The method comprises, in step S202, determining uplink communications resources of a wireless access interface of the wireless communications network to be used for the transmission of data by the communications device. The process then comprises in step S203, receiving an uplink cancellation indicator that indicates that at least a portion of the uplink communications resources is allocated for the transmission of signals by another communications device and is located within communications resources of a reference region associated with the uplink cancellation indicator, the reference region being formed of a specified number of sub-regions. In step S204, the process involves determining that an overlapping portion of the reference region overlaps in both of frequency and time with a region of the wireless access interface that is dedicated for downlink transmissions. The method then involves, in step S205, determining that one or more of the sub-regions that are at least partially located within the overlapping portion of the reference region are to be excluded from the reference region, before comprising, in step S206, repartitioning at least one of the sub-regions that are not to be excluded from the reference region to form smaller sub-regions such that, after the adjustment, the number of sub-regions that are not to be excluded from the reference region is equal to the specified number of sub-regions. The process ends in step S207.

Those skilled in the art would appreciate that the methods shown by FIGS. 19 and 20 may be adapted in accordance with embodiments of the present technique. For example, other preliminary, intermediate, or subsequent steps as described herein may be included in the method, or the steps may be performed in any logical order.

Though embodiments of the present technique have been described largely by way of the example communications systems shown in FIGS. 10 and 13, it would be clear to those skilled in the art that they could be equally applied to other systems to those described herein. Furthermore, to the extent that the various arrangements described herein are described individually, these can be combined with any other arrangement described herein providing the two do not contradict one another.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device configured to transmit signals to or receive signals from a wireless communications network, the communications device comprising transceiver circuitry configured to transmit signals to and receive signals from the wireless communications network via a wireless access interface of the wireless communications network, and controller circuitry configured in combination with the transceiver circuitry to determine uplink communications resources of the wireless access interface to be used for the transmission of data by the communications device, to receive a plurality of uplink cancellation indicators that each indicate that at least a portion of the uplink communications resources is allocated for the transmission of signals by another communications device and is located within communications resources of one of a plurality of reference regions, each of the reference regions being associated with one of the uplink cancellation indicators, to determine that a portion of a first of the reference regions overlaps in both of frequency and time with a portion of a second of the reference regions, the portion of the uplink communications resources located within the communications resources of the first reference region being a first portion of the uplink communications resources and the portion of the uplink communications resources located within the communications resources of the second reference region being a second portion of the uplink communications resources, and to determine, in accordance with dimensions of the first reference region and dimensions of the second reference region, that at least a third portion of the uplink communications resources is allocated for the transmission of signals by another communications device.

Paragraph 2. A communications device according to Paragraph 1, wherein the communications device is configured to determine that the dimensions of the first reference region are different to the dimensions of the second reference region, to determine that the at least the third portion of the uplink communications resources comprises parts of either of the at least the first portion of the uplink communications resources and the at least the second portion of the uplink communications resources that do not overlap with any parts of the other of the at least the first portion of the uplink communications resources and the at least the second portion of the uplink communications resources and that are located within the portion of the first reference region and the portion of the second reference region that overlap in both of frequency and time, and to determine that the at least the third portion of the uplink communications resources further comprises all parts of the at least the first portion of the uplink communications resources and the at least the second portion of the uplink communications resources that occupy the same communications resources in frequency and time as each other and that are located within the portion of the first reference region and the portion of the second reference region that overlap in both of frequency and time.

Paragraph 3. A communications device according to Paragraph 1, wherein the communications device is configured to determine that the dimensions of the first reference region are the same as the dimensions of the second reference region, and to determine that the at least the third portion of the uplink communications resources consists of all parts of each of the at least the first portion of the uplink communications resources and the at least the second portion of the uplink communications resources that are located within the portion of the first reference region and the portion of the second reference region that overlap in both of frequency and time.

Paragraph 4. A communications device according to any of Paragraphs 1 to 3, wherein each of the uplink cancellation indicators comprises a bitmap comprising a plurality of bits each representing a sub-region of the communications resources of the reference region associated with the uplink cancellation indicator, wherein a value of each of the one or more bits indicates whether or not the sub-region of the communications resources of the reference region associated with that bit is comprises at least the portion of the uplink communications resources, indicated by the uplink cancellation indicator, that are allocated for the transmission of signals by the other communications device.

Paragraph 5. A communications device according to any of Paragraphs 1 to 4, wherein the controller circuitry is configured in combination with the transceiver circuitry to determine that an overlapping portion of one of the reference regions overlaps in both of frequency and time with a region of the wireless access interface that is dedicated for downlink transmissions, the one of the reference regions being formed of a specified number of sub-regions, to determine that one or more of the sub-regions that are at least partially located within the overlapping portion of the one of the reference regions are to be excluded from the one of the reference regions, and to repartition at least some of the sub-regions that are not to be excluded from the one of the reference regions to form smaller sub-regions such that, after the adjustment, the number of sub-regions that are not to be excluded from the one of the reference regions is equal to the specified number of sub-regions.

Paragraph 6. A communications device according to Paragraph 5, wherein the one or more sub-regions that are to be excluded from the one of the reference regions are fully located within the overlapping portion of the one of the reference regions.

Paragraph 7. A communications device according to Paragraph 5 or Paragraph 6, wherein the communications device is configured to repartition each of the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned.

Paragraph 8. A communications device according to Paragraph 7, wherein one or more of the repartitioned sub-regions are located at the temporal start of the one of the reference regions and the others of the repartitioned sub-regions are located at the temporal end of the one of the reference regions.

Paragraph 9. A communications device according to Paragraph 7, wherein all of the repartitioned sub-regions are located at the temporal start of the one of the reference regions.

Paragraph 10. A communications device according to Paragraph 7, wherein all of the repartitioned sub-regions are located at the temporal end of the one of the reference regions.

Paragraph 11. A communications device according to Paragraph 5 or Paragraph 6, wherein the communications device is configured to repartition each of the repartitioned sub-regions in frequency, such that the repartitioned sub-regions occupy a same time period as the sub-regions that are not repartitioned, and such that the repartitioned sub-regions occupy a smaller frequency band than the sub-regions that are not repartitioned.

Paragraph 12. A communications device according to Paragraph 11, wherein the communications device is configured to repartition each of the repartitioned sub-regions in frequency dependent on determining that the repartitioned sub-regions cannot be divided in time.

Paragraph 13. A communications device according to any of Paragraphs 5 to 12, wherein the communications device is configured to receive a control signal, the control signal providing an indication of whether the communications device is either
- to repartition each of the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned, or
- to repartition each of the repartitioned sub-regions in frequency, such that the repartitioned sub-regions occupy a same time period as the sub-regions that are not repartitioned, and such that the repartitioned sub-regions occupy a smaller frequency band than the sub-regions that are not repartitioned.

Paragraph 14. A communications device according to any of Paragraphs 5 to 13, wherein the one or more sub-regions that are to be excluded from the one of the reference regions are located within one or more parts of the overlapping portion of the one of the reference regions that consist of semi-statically configured downlink symbols.

Paragraph 15. A communications device configured to transmit signals to or receive signals from a wireless communications network, the communications device comprising
- transceiver circuitry configured to transmit signals to and receive signals from the wireless communications network via a wireless access interface of the wireless communications network, and
- controller circuitry configured in combination with the transceiver circuitry
- to determine uplink communications resources of the wireless access interface to be used for the transmission of data by the communications device,
- to receive an uplink cancellation indicator that indicates that at least a portion of the uplink communications resources is allocated for the transmission of signals by another communications device and is located within communications resources of a reference region associated with the uplink cancellation indicator, the reference region being formed of a specified number of sub-regions,
- to determine that an overlapping portion of the reference region overlaps in both of frequency and time with a region of the wireless access interface that is dedicated for downlink transmissions,
- to determine that one or more of the sub-regions that are at least partially located within the overlapping portion of the reference region are to be excluded from the reference region, and
- to repartition at least one of the sub-regions that are not to be excluded from the reference region to form smaller sub-regions such that, after the adjustment, the number of sub-regions that are not to be excluded from the reference region is equal to the specified number of sub-regions.

Paragraph 16. A communications device according to Paragraph 15, wherein the one or more sub-regions that are to be excluded from the reference region are fully located within the overlapping portion of the reference region.

Paragraph 17. A communications device according to Paragraph 15 or Paragraph 16, wherein the communications device is configured to repartition each of the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned.

Paragraph 18. A communications device according to Paragraph 17, wherein one or more of the repartitioned sub-regions are located at the temporal start of the reference region and the others of the divided sub-regions are located at the temporal end of the reference region.

Paragraph 19. A communications device according to Paragraph 17, wherein all of the repartitioned sub-regions are located at the temporal start of the reference region.

Paragraph 20. A communications device according to Paragraph 17, wherein all of the repartitioned sub-regions are located at the temporal end of the reference region.

Paragraph 21. A communications device according to Paragraph 15 or Paragraph 16, wherein the communications device is configured to repartition each of the repartitioned sub-regions in frequency, such that the repartitioned sub-regions occupy a same time period as the sub-regions that are not repartitioned, and such that the repartitioned sub-regions occupy a smaller frequency band than the sub-regions that are not repartitioned.

Paragraph 22. A communications device according to Paragraph 21, wherein the communications device is configured to repartition each of the repartitioned sub-regions in frequency dependent on determining that the repartitioned sub-regions cannot be repartition in time.

Paragraph 23. A communications device according to any of Paragraphs 15 to 22, wherein the communications device is configured to receive a control signal, the control signal providing an indication of whether the communications device is either
- to repartition each of the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned, or
- to repartition each of the repartitioned sub-regions in frequency, such that the repartitioned sub-regions occupy a same time period as the sub-regions that are not repartitioned, and such that the repartitioned sub-regions occupy a smaller frequency band than the sub-regions that are not repartitioned Paragraph 24. A communications device according to any of Paragraphs 15 go 23, wherein the one or more sub-regions that are to be excluded from the reference region are located within one or more parts of the overlapping portion of the reference region that consist of semi-statically configured downlink symbols.

Paragraph 25. A method of operating a communications device configured to transmit signals to or receive signals from a wireless communications network, the method comprising determining uplink communications resources of a wireless access interface of the wireless communications network to be used for the transmission of data by the communications device, receiving a plurality of uplink cancellation indicators that each indicate that at least a portion of the uplink communications resources is allocated for the transmission of signals by another communications device and is located within communications resources of one of a plurality of reference regions, each of the reference regions being associated with one of the uplink cancellation indicators, determining that a portion of a first of the reference regions overlaps in both of frequency and time with a portion of a second of the reference regions, the portion of the uplink communications resources located within the communications resources of the first reference region being a first portion of the uplink communications resources and the portion of the uplink communications resources located within the communications resources of the second reference region being a second portion of the uplink communications resources, and determining, in accordance with dimensions of the first reference region and dimensions of the second reference region, that at least a third portion of the uplink communications resources is allocated for the transmission of signals by another communications device.

Paragraph 26. Circuitry for a communications device configured to transmit signals to or receive signals from a wireless communications network, the communications device comprising transceiver circuitry configured to transmit signals to and receive signals from the wireless communications network via a wireless access interface of the wireless communications network, and controller circuitry configured in combination with the transceiver circuitry to determine uplink communications resources of the wireless access interface to be used for the transmission of data by the communications device, to receive a plurality of uplink cancellation indicators that each indicate that at least a portion of the uplink communications resources is allocated for the transmission of signals by another communications device and is located within communications resources of one of a plurality of reference regions, each of the reference regions being associated with one of the uplink cancellation indicators, to determine that a portion of a first of the reference regions overlaps in both of frequency and time with a portion of a second of the reference regions, the portion of the uplink communications resources located within the communications resources of the first reference region being a first portion of the uplink communications resources and the portion of the uplink communications resources located within the communications resources of the second reference region being a second portion of the uplink communications resources, and to determine, in accordance with dimensions of the first reference region and dimensions of the second reference region, that at least a third portion of the uplink communications resources is allocated for the transmission of signals by another communications device.

Paragraph 27. An infrastructure equipment forming part of a wireless communications network configured to transmit signals to or receive signals from communications devices, the infrastructure equipment comprising transceiver circuitry configured to transmit signals to and receive signals from the wireless communications network via a wireless access interface of the wireless communications network, and controller circuitry configured in combination with the transceiver circuitry to transmit, to one of the communications devices, an indication of uplink communications resources of the wireless access interface that are to be used for the transmission of data by the one of the communications devices, to transmit, to the one of the communications devices, a plurality of uplink cancellation indicators that each indicate that at least a portion of the uplink communications resources is allocated for the transmission of signals by another of the communications devices and is located within communications resources of one of a plurality of reference regions, each of the reference regions being associated with one of the uplink cancellation indicators, wherein the uplink cancellation indicator indicates, in accordance with dimensions of a first of the reference regions and dimensions of a second of the reference regions, that at least a third portion of the uplink communications resources is allocated for the transmission of signals the other communications device, wherein a portion of the reference region overlaps in both of frequency and time with a portion of the second reference.

Paragraph 28. A method of operating an infrastructure equipment forming part of a wireless communications network configured to transmit signals to or receive signals from communications devices, the method comprising transmitting, to one of the communications devices, an indication of uplink communications resources of a wireless access interface of the wireless communications network that are to be used for the transmission of data by the one of the communications devices, transmitting, to the one of the communications devices, a plurality of uplink cancellation indicators that each indicate that at least a portion of the uplink communications resources is allocated for the transmission of signals by another of the communications devices and is located within communications resources of one of a plurality of reference regions, each of the reference regions being associated with one of the uplink cancellation indicators, wherein the uplink cancellation indicator indicates, in accordance with dimensions of a first of the reference regions and dimensions of a second of the reference regions, that at least a third portion of the uplink communications resources is allocated for the transmission of signals the other communications device, wherein a portion of the reference region overlaps in both of frequency and time with a portion of the second reference.

Paragraph 29. Circuitry for an infrastructure equipment forming part of a wireless communications network configured to transmit signals to or receive signals from communications devices, the infrastructure equipment comprising
    transceiver circuitry configured to transmit signals to and receive signals from the wireless communications network via a wireless access interface of the wireless communications network, and
    controller circuitry configured in combination with the transceiver circuitry
        to transmit, to one of the communications devices, an indication of uplink communications resources of the wireless access interface that are to be used for the transmission of data by the one of the communications devices,
        to transmit, to the one of the communications devices, a plurality of uplink cancellation indicators that each indicate that at least a portion of the uplink communications resources is allocated for the transmission of signals by another of the communications devices and is located within communications resources of one of a plurality of reference regions, each of the reference regions being associated with one of the uplink cancellation indicators,
        wherein the uplink cancellation indicator indicates, in accordance with dimensions of a first of the reference regions and dimensions of a second of the reference regions, that at least a third portion of the uplink communications resources is allocated for the transmission of signals the other communications device, wherein a portion of the reference region overlaps in both of frequency and time with a portion of the second reference.

Paragraph 30. A method of operating a communications device configured to transmit signals to or receive signals from a wireless communications network, the method comprising
    determining uplink communications resources of a wireless access interface of the wireless communications network to be used for the transmission of data by the communications device,
    receiving an uplink cancellation indicator that indicates that at least a portion of the uplink communications resources is allocated for the transmission of signals by another communications device and is located within communications resources of a reference region associated with the uplink cancellation indicator, the reference region being formed of a specified number of sub-regions,
    determining that an overlapping portion of the reference region overlaps in both of frequency and time with a region of the wireless access interface that is dedicated for downlink transmissions,
    determining that one or more of the sub-regions that are at least partially located within the overlapping portion of the reference region are to be excluded from the reference region, and
    repartitioning at least one of the sub-regions that are not to be excluded from the reference region to form smaller sub-regions such that, after the adjustment, the number of sub-regions that are not to be excluded from the reference region is equal to the specified number of sub-regions.

Paragraph 31. Circuitry for a communications device configured to transmit signals to or receive signals from a wireless communications network, the communications device comprising
    transceiver circuitry configured to transmit signals to and receive signals from the wireless communications network via a wireless access interface of the wireless communications network, and
    controller circuitry configured in combination with the transceiver circuitry
        to determine uplink communications resources of the wireless access interface to be used for the transmission of data by the communications device,
        to receive an uplink cancellation indicator that indicates that at least a portion of the uplink communications resources is allocated for the transmission of signals by another communications device and is located within communications resources of a reference region associated with the uplink cancellation indicator, the reference region being formed of a specified number of sub-regions,
        to determine that an overlapping portion of the reference region overlaps in both of frequency and time with a region of the wireless access interface that is dedicated for downlink transmissions,
        to determine that one or more of the sub-regions that are at least partially located within the overlapping portion of the reference region are to be excluded from the reference region, and
        to repartition at least one of the sub-regions that are not to be excluded from the reference region to form smaller sub-regions such that, after the adjustment, the number of sub-regions that are not to be excluded from the reference region is equal to the specified number of sub-regions.

Paragraph 32. An infrastructure equipment forming part of a wireless communications network configured to transmit signals to or receive signals from communications devices, the infrastructure equipment comprising
    transceiver circuitry configured to transmit signals to and receive signals from the wireless communications network via a wireless access interface of the wireless communications network, and
    controller circuitry configured in combination with the transceiver circuitry
        to transmit, to one of the communications devices, an indication of uplink communications resources of the wireless access interface that are to be used for the transmission of data by the one of the communications devices,
        to transmit, to the one of the communications devices, an uplink cancellation indicator that indicates that at least a portion of the uplink communications resources is allocated for the transmission of signals by another of the communications devices and is located within communications resources of a reference region associated with the uplink cancellation indicator, the reference region being formed of a specified number of sub-regions, wherein an overlapping portion of the reference region overlaps in both of frequency and time with a region of the wireless access interface that is dedicated for downlink transmissions,
        wherein the uplink cancellation indicator indicates that one or more of the sub-regions that are at least partially located within the overlapping portion of the reference are to be excluded from the reference region, and wherein the uplink cancellation indicator indicates that at least one of the sub-regions that are not to be excluded from the reference region is to be repartitioned to form smaller sub-regions such that, after the adjustment, the number of sub-regions that are not to be excluded from the reference region is equal to the specified number of sub-regions.

Paragraph 33. A method of operating an infrastructure equipment forming part of a wireless communications network configured to transmit signals to or receive signals from communications devices, the method comprising
    transmitting, to one of the communications devices, an indication of uplink communications resources of a wireless access interface of the wireless communications network that are to be used for the transmission of data by the one of the communications devices,
    transmitting, to the one of the communications devices, an uplink cancellation indicator that indicates that at least a portion of the uplink communications resources is allocated for the transmission of signals by another of the communications devices and is located within communications resources of a reference region associated with the uplink cancellation indicator, the reference region being formed of a specified number of sub-regions, wherein an overlapping portion of the reference region overlaps in both of frequency and time with a region of the wireless access interface that is dedicated for downlink transmissions,
    wherein the uplink cancellation indicator indicates that one or more of the sub-regions that are at least partially located within the overlapping portion of the reference region are to be excluded from the reference region, and wherein the uplink cancellation indicator indicates that at least one of the sub-regions that are not to be excluded from the reference region is to be repartitioned to form smaller sub-regions such that, after the adjustment, the number of sub-regions that are not to be excluded from the reference region is equal to the specified number of sub-regions.

Paragraph 34. Circuitry for an infrastructure equipment forming part of a wireless communications network configured to transmit signals to or receive signals from communications devices, the infrastructure equipment comprising
    transceiver circuitry configured to transmit signals to and receive signals from the wireless communications network via a wireless access interface of the wireless communications network, and
    controller circuitry configured in combination with the transceiver circuitry
    to transmit, to one of the communications devices, an indication of uplink communications resources of the wireless access interface that are to be used for the transmission of data by the one of the communications devices,
    to transmit, to the one of the communications devices, an uplink cancellation indicator that indicates that at least a portion of the uplink communications resources is allocated for the transmission of signals by another of the communications devices and is located within communications resources of a reference region associated with the uplink cancellation indicator, the reference region being formed of a specified number of sub-regions, wherein an overlapping portion of the reference region overlaps in both of frequency and time with a region of the wireless access interface that is dedicated for downlink transmissions,
    wherein the uplink cancellation indicator indicates that one or more of the sub-regions that are at least partially located within the overlapping portion of the reference region are to be excluded from the reference region, and wherein the uplink cancellation indicator indicates that at least one of the sub-regions that are not to be excluded from the reference region is to be repartitioned to form smaller sub-regions such that, after the adjustment, the number of sub-regions that are not to be excluded from the reference region is equal to the specified number of sub-regions.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] 3GPP TS 38.300 v15.2.0 "NR; NR and NG-RAN Overall Description; Stage 2 (Release 15)", $3^{rd}$ Generation Partnership Project, June 2018.
[2] Holma H. and Toskala A, "LTE for UMTS OFDMA and SC-FDMA based radio access", John Wiley and Sons, 2009.
[3] 3GPP TR 38.824, "Study on physical layer enhancements for NR ultra-reliable and low latency case (URLLC) (Rel-16)", v1.2.0, $3^{rd}$ Generation Partnership Project, March 2019.
[4] RP-182089, "Study on physical layer enhancements for NR ultra-reliable and low latency case (URLLC)," Huawei, HiSilicon, Nokia, Nokia Shanghai Bell, RAN #81, September 2018.
[5] European Patent Application no. EP16189083.5.
[6] 3GPP TS 38.212, "Multiplexing and channel coding (Release 15)" $3^{rd}$ Generation Partnership Project, November 2018.
[7] European Patent Application no. EP17176495.4.
[8] R1-1909268, "Uplink Inter-UE Tx Multiplexing and Prioritization," Qualcomm, RAN1 #98.
[9] R1-1908671, "Inter UE Tx prioritization and multiplexing," OPPO, RAN1 #98.
[10] R1-1910103, "On scheduling/HARQ enhancements for NR URLLC," ZTE, RAN1 #98bis.
[11] R1-1911712, "Summary #4 of UL inter UE Tx prioritization/multiplexing," vivo, RAN1 #98bis.

What is claimed is:
1. A communications device configured to transmit signals to or receive signals from a wireless communications network, the communications device comprising
    transceiver circuitry configured to transmit signals to and receive signals from the wireless communications net- work via a wireless access interface of the wireless communications network, and controller circuitry configured in combination with the transceiver circuitry to determine uplink communications resources of the wireless access interface to be used for the transmission of data by the communications device, to receive a plurality of uplink cancellation indicators that each indicate that at least a portion of the uplink communications resources is allocated for the transmission of signals by another communications device and is located within communications resources of one of a plurality of reference regions, each of the reference regions being associated with one of the uplink cancellation indicators, to determine that a portion of a first of the reference regions overlaps in both of frequency and time with a portion of a second of the reference regions, the portion of the uplink communications resources located within the communications resources of the first reference region being a first portion of the uplink communications resources and the portion of the uplink communications resources located within the communications resources of the second reference region being a second portion of the uplink communications resources, and to determine, in accordance with dimensions of the first reference region and dimensions of the second reference region, that at least a third portion of the uplink communications resources is allocated for the transmission of signals by another communications device.

2. A communications device according to claim 1, wherein the communications device is configured to determine that the dimensions of the first reference region are different to the dimensions of the second reference region, to determine that the at least the third portion of the uplink communications resources comprises parts of either of the at least the first portion of the uplink communications resources and the at least the second portion of the uplink communications resources that do not overlap with any parts of the other of the at least the first portion of the uplink communications resources and the at least the second portion of the uplink communications resources and that are located within the portion of the first reference region and the portion of the second reference region that overlap in both of frequency and time, and to determine that the at least the third portion of the uplink communications resources further comprises all parts of the at least the first portion of the uplink communications resources and the at least the second portion of the uplink communications resources that occupy the same communications resources in frequency and time as each other and that are located within the portion of the first reference region and the portion of the second reference region that overlap in both of frequency and time.

3. A communications device according to claim 1, wherein the communications device is configured to determine that the dimensions of the first reference region are the same as the dimensions of the second reference region, and to determine that the at least the third portion of the uplink communications resources consists of all parts of each of the at least the first portion of the uplink communications resources and the at least the second portion of the uplink communications resources that are located within the portion of the first reference region and the portion of the second reference region that overlap in both of frequency and time.

4. A communications device according to claim 1, wherein each of the uplink cancellation indicators comprises a bitmap comprising a plurality of bits each representing a sub-region of the communications resources of the reference region associated with the uplink cancellation indicator, wherein a value of each of the one or more bits indicates whether or not the sub-region of the communications resources of the reference region associated with that bit is comprises at least the portion of the uplink communications resources, indicated by the uplink cancellation indicator, that are allocated for the transmission of signals by the other communications device.

5. A communications device according to claim 1, wherein the controller circuitry is configured in combination with the transceiver circuitry to determine that an overlapping portion of one of the reference regions overlaps in both of frequency and time with a region of the wireless access interface that is dedicated for downlink transmissions, the one of the reference regions being formed of a specified number of sub-regions, to determine that one or more of the sub-regions that are at least partially located within the overlapping portion of the one of the reference regions are to be excluded from the one of the reference regions, and to repartition at least some of the sub-regions that are not to be excluded from the one of the reference regions to form smaller sub-regions such that, after the adjustment, the number of sub-regions that are not to be excluded from the one of the reference regions is equal to the specified number of sub-regions.

6. A communications device according to claim 5, wherein the one or more sub-regions that are to be excluded from the one of the reference regions are fully located within the overlapping portion of the one of the reference regions.

7. A communications device according to claim 5, wherein the communications device is configured to repartition each of the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned.

8. A communications device according to claim 7, wherein one or more of the repartitioned sub-regions are located at the temporal start of the one of the reference regions and the others of the repartitioned sub-regions are located at the temporal end of the one of the reference regions.

9. A communications device according to claim 7, wherein all of the repartitioned sub-regions are located at the temporal start of the one of the reference regions.

10. A communications device according to claim 7, wherein all of the repartitioned sub-regions are located at the temporal end of the one of the reference regions.

11. A communications device according to claim 5, wherein the communications device is configured to repartition each of the repartitioned sub-regions in frequency, such that the repartitioned sub-regions occupy a same time period as the sub-regions that are not repartitioned, and such that the repartitioned sub-regions occupy a smaller frequency band than the sub-regions that are not repartitioned.

12. A communications device according to claim 11, wherein the communications device is configured to repartition each of the repartitioned sub-regions in frequency dependent on determining that the repartitioned sub-regions cannot be divided in time.

13. A communications device according to claim 5, wherein the communications device is configured to receive a control signal, the control signal providing an indication of whether the communications device is either
- to repartition each of the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned, or
- to repartition each of the repartitioned sub-regions in frequency, such that the repartitioned sub-regions occupy a same time period as the sub-regions that are not repartitioned, and such that the repartitioned sub-regions occupy a smaller frequency band than the sub-regions that are not repartitioned.

14. A communications device according to claim 5, wherein the one or more sub-regions that are to be excluded from the one of the reference regions are located within one or more parts of the overlapping portion of the one of the reference regions that consist of semi-statically configured downlink symbols.

15. A communications device configured to transmit signals to or receive signals from a wireless communications network, the communications device comprising
- transceiver circuitry configured to transmit signals to and receive signals from the wireless communications network via a wireless access interface of the wireless communications network, and
- controller circuitry configured in combination with the transceiver circuitry
  - to determine uplink communications resources of the wireless access interface to be used for the transmission of data by the communications device,
  - to receive an uplink cancellation indicator that indicates that at least a portion of the uplink communications resources is allocated for the transmission of signals by another communications device and is located within communications resources of a reference region associated with the uplink cancellation indicator, the reference region being formed of a specified number of sub-regions,
  - to determine that an overlapping portion of the reference region overlaps in both of frequency and time with a region of the wireless access interface that is dedicated for downlink transmissions,
  - to determine that one or more of the sub-regions that are at least partially located within the overlapping portion of the reference region are to be excluded from the reference region, and
  - to repartition at least one of the sub-regions that are not to be excluded from the reference region to form smaller sub-regions such that, after the adjustment, the number of sub-regions that are not to be excluded from the reference region is equal to the specified number of sub-regions.

16. A communications device according to claim 15, wherein the one or more sub-regions that are to be excluded from the reference region are fully located within the overlapping portion of the reference region.

17. A communications device according to claim 15, wherein the communications device is configured to repartition each of the repartitioned sub-regions in time, such that the repartitioned sub-regions occupy a same frequency band as the sub-regions that are not repartitioned, and such that the repartitioned sub-regions occupy a smaller time period than the sub-regions that are not repartitioned.

18. A communications device according to claim 17, wherein one or more of the repartitioned sub-regions are located at the temporal start of the reference region and the others of the divided sub-regions are located at the temporal end of the reference region.

19. A communications device according to claim 17, wherein all of the repartitioned sub-regions are located at the temporal start of the reference region.

20. An infrastructure equipment forming part of a wireless communications network configured to transmit signals to or receive signals from communications devices, the infrastructure equipment comprising
- transceiver circuitry configured to transmit signals to and receive signals from the wireless communications network via a wireless access interface of the wireless communications network, and
- controller circuitry configured in combination with the transceiver circuitry
  - to transmit, to one of the communications devices, an indication of uplink communications resources of the wireless access interface that are to be used for the transmission of data by the one of the communications devices,
  - to transmit, to the one of the communications devices, a plurality of uplink cancellation indicators that each indicate that at least a portion of the uplink communications resources is allocated for the transmission of signals by another of the communications devices and is located within communications resources of one of a plurality of reference regions, each of the reference regions being associated with one of the uplink cancellation indicators,
  - wherein the uplink cancellation indicator indicates, in accordance with dimensions of a first of the reference regions and dimensions of a second of the reference regions, that at least a third portion of the uplink communications resources is allocated for the transmission of signals by the other communications device, wherein a portion of the reference region overlaps in both of frequency and time with a portion of the second reference.

* * * * *